US011379592B2

(12) United States Patent
Shanbhogue et al.

(10) Patent No.: US 11,379,592 B2
(45) Date of Patent: Jul. 5, 2022

(54) WRITE-BACK INVALIDATE BY KEY IDENTIFIER

(71) Applicant: Intel Corporation, Santa Clara, CA (US)

(72) Inventors: Vedvyas Shanbhogue, Austin, TX (US); Stephen Van Doren, Portland, OR (US); Gilbert Neiger, Portland, OR (US); Barry E. Huntley, Hillsboro, OR (US); Amy L. Santoni, Scottsdale, AZ (US); Raghunandan Makaram, Northborough, MA (US); Hormuzd Khosravi, Portland, OR (US); Siddhartha Chhabra, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 789 days.

(21) Appl. No.: 16/228,121

(22) Filed: Dec. 20, 2018

(65) Prior Publication Data

US 2020/0202012 A1    Jun. 25, 2020

(51) Int. Cl.
| H04L 29/06 | (2006.01) |
| G06F 21/60 | (2013.01) |
| G06F 12/0804 | (2016.01) |
| G06F 12/0864 | (2016.01) |
| G06F 9/455 | (2018.01) |

(Continued)

(52) U.S. Cl.
CPC ........ *G06F 21/602* (2013.01); *G06F 9/45558* (2013.01); *G06F 12/0804* (2013.01); *G06F 12/0864* (2013.01); *G06F 12/0891* (2013.01); *H04L 9/0866* (2013.01); *G06F 2009/45583* (2013.01)

(58) Field of Classification Search
CPC ............... G06F 21/602; G06F 9/45558; G06F 12/0804; G06F 12/0864; G06F 12/0891; G06F 2009/45583; H04L 9/0866
See application file for complete search history.

(56) References Cited

U.S. PATENT DOCUMENTS

| 2003/0182512 | A1* | 9/2003 | Hammarlund | ...... G06F 12/0842 711/E12.039 |
| 2013/0332668 | A1* | 12/2013 | Diep | .................... G11C 7/1072 711/105 |
| 2019/0050332 | A1* | 2/2019 | Alameldeen | ........ G06F 12/0891 |

(Continued)

*Primary Examiner* — Shin-Hon (Eric) Chen
(74) *Attorney, Agent, or Firm* — Nicholson De Vos Webster & Elliott, LLP

(57) ABSTRACT

An integrated circuit includes a core and memory controller coupled to a last level cache (LLC). A first key identifier for a first program is associated with physical addresses of memory that store data of the first program. To flush and invalidate cache lines associated with the first key identifier, the core is to execute an instruction (having the first key identifier) to generate a transaction with the first key identifier. In response to the transaction, a cache controller of the LLC is to: identify matching entries in the LLC by comparison of first key identifier with at least part of an address tag of a plurality of entries in a tag storage structure of the LLC, the matching entries associated with cache lines of the LLC; write back, to the memory, data stored in the cache lines; and mark the matching entries of the tag storage structure as invalid.

20 Claims, 17 Drawing Sheets

(51) Int. Cl.
*H04L 9/08* (2006.01)
*G06F 12/0891* (2016.01)

(56) References Cited

U.S. PATENT DOCUMENTS

| | | | |
|---|---|---|---|
| 2019/0073305 A1* | 3/2019 | Hijaz | G06F 12/0848 |
| 2019/0182040 A1* | 6/2019 | Hunt | H04L 9/0894 |
| 2020/0034152 A1* | 1/2020 | Carlson | G06F 21/60 |
| 2020/0218665 A1* | 7/2020 | Swaine | G06F 12/0864 |

* cited by examiner

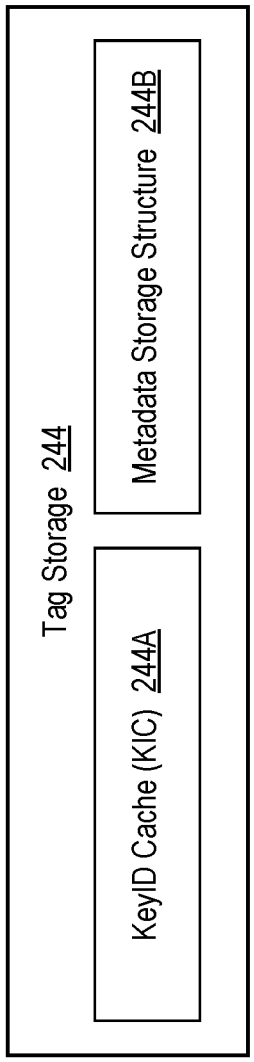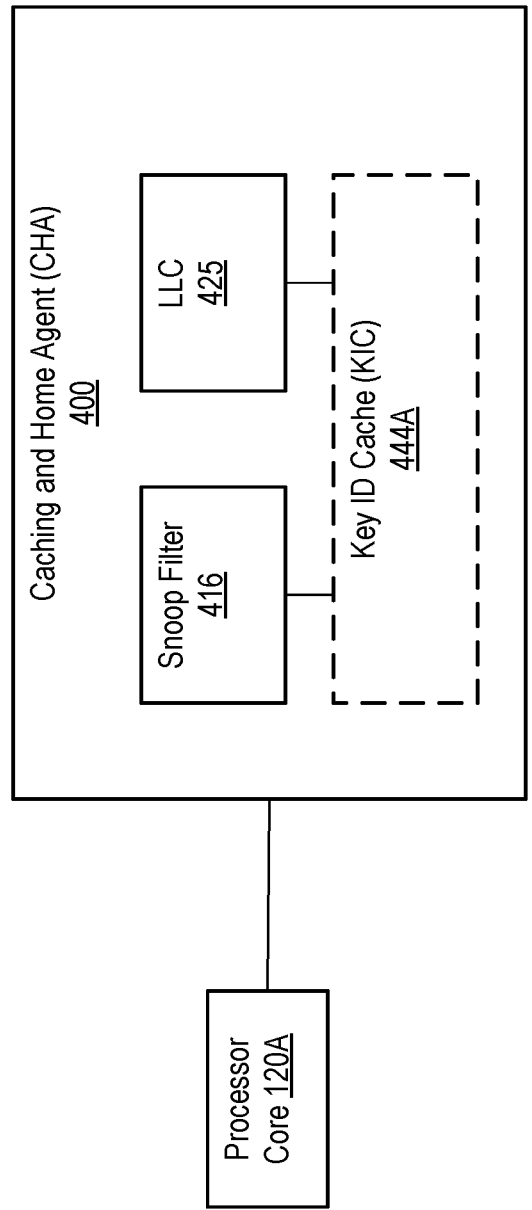

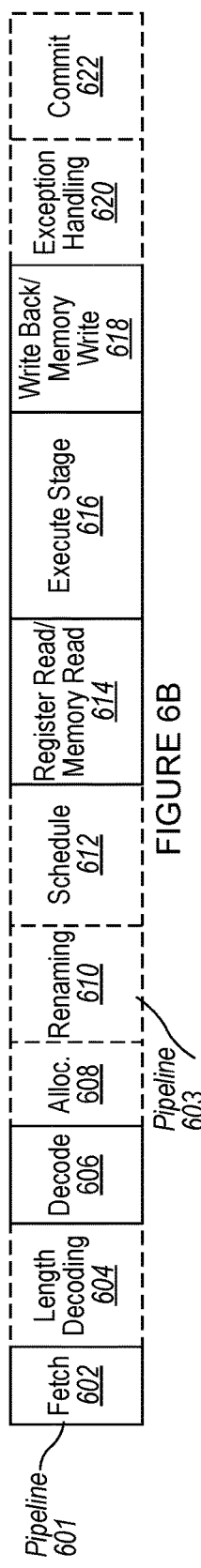
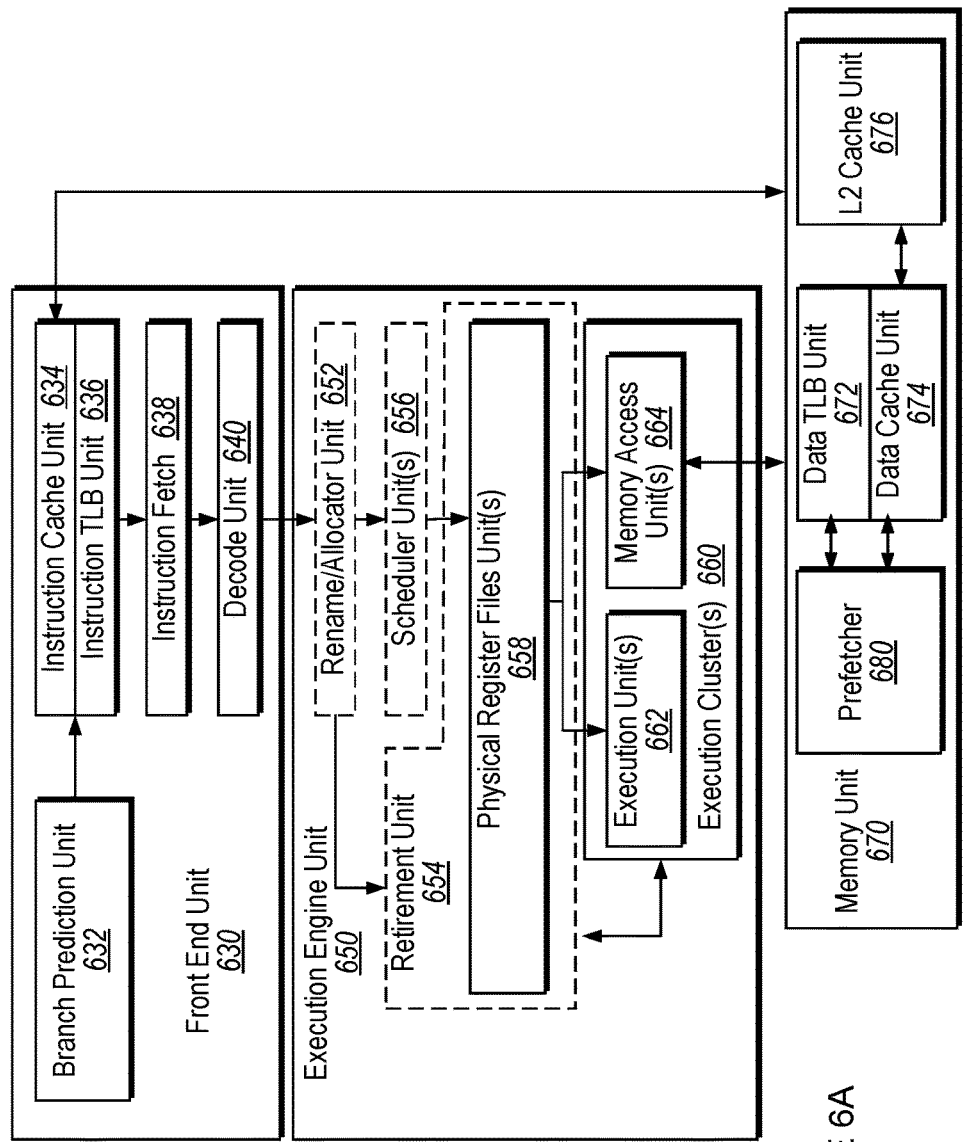
FIGURE 6B
FIGURE 6A

WRITE-BACK INVALIDATE BY KEY IDENTIFIER

TECHNICAL FIELD

The disclosure relates to protection of data stored in memory of a computer system, and more particularly, to write-back invalidation by key identifier (ID).

BACKGROUND

Modern computing systems employ disk encryption to protect data stored at rest on hard drive disks or other data storage. Attackers, however, can use a variety of techniques including bus scanning, memory scanning, and the like, to retrieve data from memory. The memory may itself include the keys used for disk encryption, thus exposing the data encrypted on a disk drive. Various techniques, therefore, have been employed to protect sensitive data residing in at least some regions of memory. Doing so has become challenging, particularly in a cloud or server environment where multiple customer workloads (from different entities) may be supported simultaneously on the same server.

BRIEF DESCRIPTION OF THE DRAWINGS

FIG. 3 is a block diagram of the tag storage structure of the system architectures of any of FIGS. 2A-2C according an implementation.

FIG. 4 is a block diagram of an example caching and home agent (CHA) according to an implementation.

FIG. 6A is a block diagram illustrating an in-order pipeline and a register renaming stage, out-of-order issue/execution pipeline according to one implementation.

FIG. 6B is a block diagram illustrating a micro-architecture for a processor or an integrated circuit that may implement hardware support for write-back invalidation by key identifier, according to an implementation of the disclosure.

DETAILED DESCRIPTION

Figure 1A:
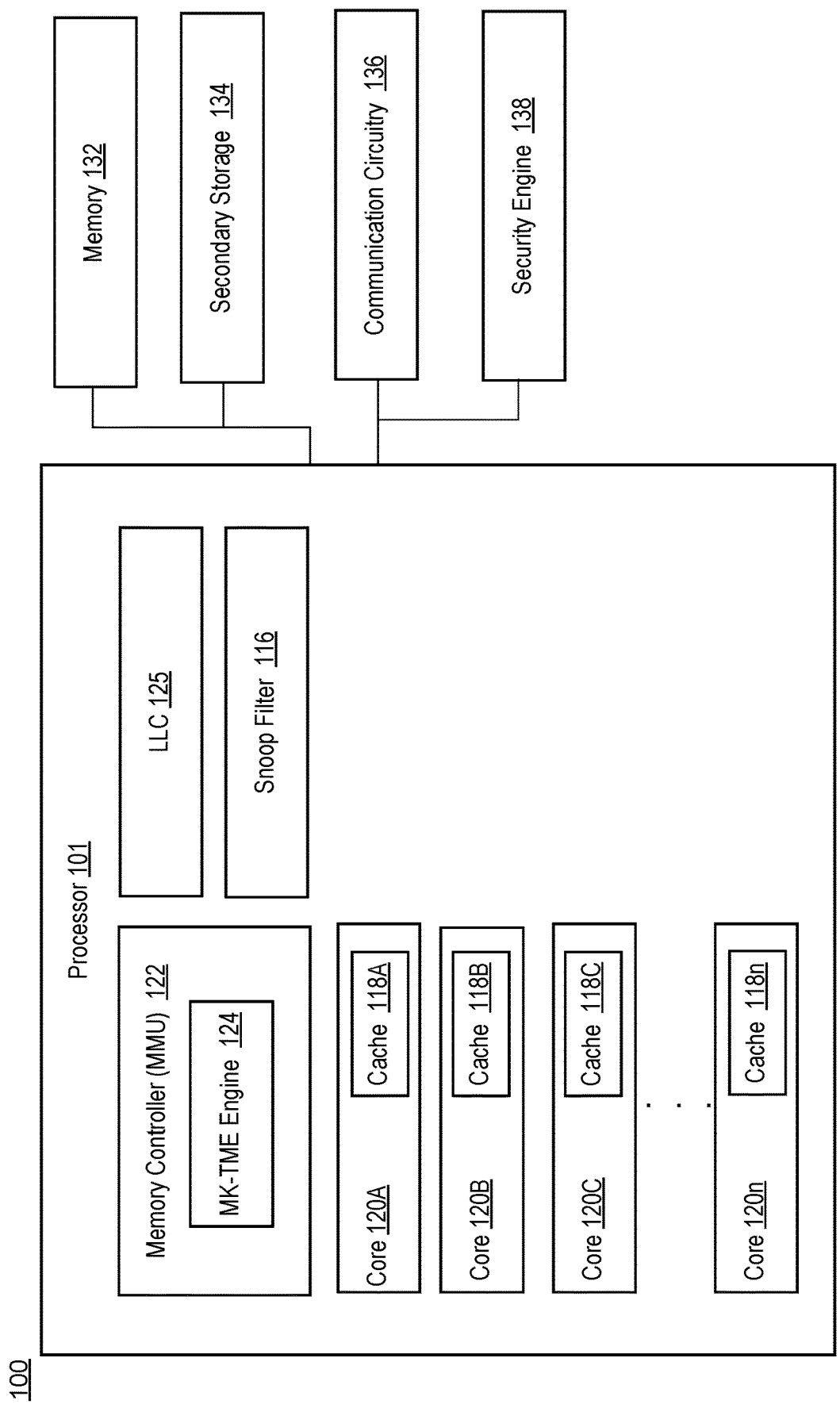
FIGS. 1A and 1B are a block diagram of an example computing system that provides the ability to write-back invalidate by key identifier (ID), according to various implementations.

Various techniques have been employed to protect sensitive data residing in regions of memory. Some processors provide cryptographic mechanisms for encryption, integrity, and replay protection. Memory encryption protects the confidentiality of memory-resident data. For example, total memory encryption (TME) may encrypt data that is moving from a processor core to memory, and may decrypt the encrypted data on its way back to the processor core.

Implementations of the disclosure extend the functionality of a TME engine to support multiple keys in a multi-key (MK), hardware cryptographic engine, e.g., a MK-TME engine. This extension of functionality provides support for a different key per secure domain serviced by a server, e.g., up to dozens or even thousands of domains on a given server hosted by a cloud service provider (CSP). Domains may refer to workloads, such as a client machine (e.g., virtual machine), an operating system, an application, programs, or other types of workloads the server supports that may be associated with different customer entities.

For example, a secure domain may be a customer workload, such as an operating system, along with other ring-3 applications executing on top of the operating system, or a virtual machine (VM) executing on top of a virtual machine monitor (VMM) along with other ring-3 applications. The benefit of supporting the use of multiple keys is to provide cryptographic isolation between different customer domains, e.g., one secure domain cannot access encrypted data if that encrypted data belongs to a different secure domain being protected with a different cryptographic key. These benefits extend to the ability of a CSP to support a growing number of customer workloads on the same server, to adapt to growing demands for cloud-based hardware resources.

In various implementations, a MK-TME engine may assign different keys to different domains. For example, each VM controlled by the VMM may be assigned a unique key. Accordingly, the code and data of a VM cannot be accessed by another VM. A memory controller such as a memory management unit (MMU) may use key identifiers (IDs) to perform encryption and decryption using keys corresponding to the key IDs for those domains. One way to manage key access is to append a key ID to the upper-most bits of a physical address in main memory that the memory controller can check, e.g., as illustrated in FIG. 1C. When a memory transaction (such as a load or a store operation) reaches the memory controller, the memory controller may strip out or otherwise access the upper (or most significant)

bits of the physical address and use them to identify the key with which to encrypt or decrypt the data associated with the memory transaction.

Although the memory controller (e.g., the MK-TME engine portion of the memory controller) may use a certain number of the upper-most bits to determine the key ID, the memory controller reads the entire string of bits as the physical address (to include the key ID bits), which creates multiple cache lines for the same physical address that may have two different key IDs. This approach of using physical address aliasing for key IDs means that when a page is moved from one key domain to another (e.g., from a first VM to a second VM), or just to retire the first VM, all lines cached in the coherent domain that are prefixed with the old key ID are flushed out (e.g., written back) to main memory to avoid data corruption. This is the case where a location in main memory was encrypted for use by one program and has to be cleared for use by another, different program. The memory controller is to ensure there are no copies of that data in the cache associated with the old key ID.

When such page reallocation is done as part of software flows such as VM teardown, the VMM (or other control software) has no way of knowing which lines from memory allocated to that VM are currently cached and thus the VMM (or other control software) resorts to using a write-back invalidate (WBINVD) instruction to writeback all caches and invalidate all corresponding cache lines. Consequently, all domains currently running start with an empty cache after the WBINVD instruction execution, causing a significant performance hit as cache is intended to significantly speed up memory access for recently-accessed data. In these conventional approaches, all memory accesses have to be read back into the cache until the cache is at least partially filled.

To resolve such performance disadvantages that are a side effect of the employing multiple keys for corresponding isolated domains, the architecture of implementations of the disclosure introduces at least one new instruction (WB-INVD-BY-KEYID), which when executed by a processor core, causes a cache controller of a cache (e.g., a last level cache (LLC), a snoop filter, or other cache) to write back and invalidate only the cache lines tagged with a key ID specified within an operand of the instruction. An LLC may be the last or highest level cache oriented just before memory. Accordingly, aspects of the disclosure relate to different ways in which the processor core may generate related transactions to send to the cache that cause the cache to perform certain operations, e.g., to match the key ID within the operand to address tags within a tag storage structure of set-associative cache.

In one implementation, an integrated circuit includes a core coupled to a memory controller and an LLC, e.g., an inclusive last level cache. An inclusive LLC is one whose cache lines are inclusive of the lower levels of caches (e.g., L1, L2, and the like). The memory controller may secure data of domains, executed by the core, according to corresponding key identifiers, e.g., each which is associated with a unique key. A first key identifier for a first domain may be associated with physical addresses of memory that store data of the first domain. A cache controller of the LLC may be coupled to the memory and direct data in and out between cache lines of the LLC and the memory. In one implementation, therefore, the LLC is memory-side cache. To flush and invalidate cache lines associated with the first key identifier, the core may execute the WBINVD-BY-KEYID instruction, which includes the first key identifier (e.g., within an operand of the instruction), to generate a transaction that also includes the first key identifier. The cache controller may, in response to the transaction, identify matching entries in the LLC by comparison of the first key identifier with at least part of an address tag of multiple entries in a tag storage structure of the LLC. The matching entries are associated with cache lines of the LLC. The cache controller may then write back, to the memory, data stored in the cache lines and mark the matching entries of the tag storage structure as invalid.

In another implementation, a system includes a memory and a snoop filter coupled to the memory. The snoop filter may be employed where the LLC of the system is non-inclusive, e.g., is exclusive of the data in cache lines in lower levels of cache. A snoop filter may therefore index the cache lines at multiple levels of cache throughout one or more cores (e.g., multiple cores within a multi-core processor), and is able to determine whether certain memory transactions are a hit or a miss in relation to any of these cache lines. The core may be coupled to a snoop filter, to a memory controller, and to the memory. To flush and invalidate cache lines associated with the first key identifier, the core may execute the WBINVD-BY-KEYID instruction, which includes the first key identifier, to generate a transaction that also includes the first key identifier. The snoop filter may, in response to the transaction, identify matching entries in the snoop filter by comparison of the first key identifier with at least part of an address tag of a plurality of entries in the snoop filter. The matching entries are associated with cache lines stored in cache of multiple cores. The snoop filter may further write back, to the memory, data stored in the cache lines and mark the matching entries of the snoop filter as invalid.

These features and others herein described include many benefits, in particular, to facilitate the use of an MK-TME engine and isolation of memory encryption across different domains without the performance impact of the WBINVD instruction that causes flush and invalidation of entire caches. When switching contexts or different programs within separate domains, including VM teardown, the responsiveness of the computing system may be significantly improved such as to better serve multiple separate entities in a cloud server by a CSP.

FIG. 1A is a block diagram of an example computing system 100 that provides the ability to write-back invalidate by key identifier, according to various implementations. In one implementation, the computing system 100 includes, among other components, a processor 101, memory 132 (e.g., off-chip memory), a secondary storage device 134, communication circuitry 136, and a security engine 138. The processor 101 may further include multiple cores 120A, 120B, 120C, . . . 120n (e.g., processor cores), a memory controller 122 (e.g., memory management unit (MMU)), a snoop filter 116, and a last level cache (LLC) 125 (e.g., memory-side cache or L3 cache). The memory controller 122 may further include an MK-TME engine 124. In one implementation, the computing system 100 is a server that services the domains, e.g., different workloads such as a client machine, an operating system, an application, programs, or other types of workloads being supported.

In various implementations, the processor 101 may be one of various types of processor, including a general purpose microprocessor, such as a processor in the Intel® Pentium® Processor Family, Intel® Xeon® Processor Family, Intel® Core™ Processor Family, or other processor family from Intel® Corporation, or another processor from another company, or a special purpose processor or microcontroller. The processor 101 may include multiple threads and multiple execution cores, in any combination. In one embodiment, the processor 101 is integrated in a single integrated circuit die having multiple hardware functional units (hereafter referred to as a multi-core system). The multi-core system may be a multi-core processor package, but may include other types of functional units than just processor cores. Functional hardware units may be processor cores, digital signal processors (DSP), image signal processors (ISP), graphics cores (also referred to as graphics units), voltage regulator (VR) phases, input/output (I/O) interfaces (e.g., serial links, DDR memory channels) and their controllers, network controllers, fabric controllers, or any combination thereof.

In some implementations, each of the multiple cores 120A, 120B, 120C, . . . 120n may include cache 118A, 118B, 118C, . . . 118n, respectively, e.g., a multi-level cache (L1, L2, etc.). The core 120A may be representative of the other processor cores and is explained in more detail with reference to FIG. 1B. For example, the core 120A may further include hardware registers 112 of different types, WBINVD-BY-KEYID logic 140, and a hardware virtualization support circuit 126. In various embodiments, the WBINVD-BY-KEYID logic 140 may be implemented in microcode, a hardware state machine, other firmware or logic of the core 120A, or a combination thereof. A virtual machine monitor (VMM) 110 may run on top of the core 120A, which may control one or more virtual machines (VMs) 114A . . . 114n, which are representative of domains running on top of the computing system 100. As discussed previously, additional programs and workloads may also run on the core 120A and be associated with different domains, data for each to be encrypted and decrypted with unique keys, as controlled by the MK-TME engine 124 and the memory controller 122.

With respect to the separate encryption keys, the MK-TME engine 124 may encrypt (and decrypt) data stored to (or retrieved) from the memory 132 by the core 120A. With total memory encryption (TME), any memory accesses by software executing on the core 120A can be encrypted in memory with an encryption key. The MK-TME engine 124 may be an enhancement to TME that allows use of multiple encryption keys (the number of supported keys is implementation dependent). The core 120A may utilize the MK-TME engine 124 to cause different pages in the memory 132 to be encrypted using different MK-TME keys. The MK-TME engine 124 may be utilized in secure domain architecture to support one or more encryption keys per each secure domain to help achieve the cryptographic isolation between different CSP customer workloads.

In various implementations, the LLC 125 may be an inclusive LLC or a non-inclusive (or exclusive) LLC. An inclusive LLC means that cache lines of the LLC are inclusive of the lower levels of caches (e.g., L1, L2, and the like located in the cache 118A). A non-inclusive (or exclusive) LLC means that the cache lines of the LLC are exclusive of the lower levels of the cache. In cases of non-inclusive LLC, the computing system 100 may employ the snoop filter 116 (e.g., an inclusive snoop filter) to index the cache lines across the multiple levels of cache across multiple cores, e.g., the caches 118A, 118B, 118C, . . . 118n and the LLC 125. In this way, the snoop filter 116 may find a cache line no matter where located within these various caches. The snoop filter 116 may therefore function like a large tag storage structure to store entries that correspond to data stored in cache lines across multiple coupled caches within a multi-core processor such as within the computing system 100. The current methods that employ the write-back invalidate by key ID (WBINV-BY-KEYID) instruction may be directed at cache controllers of either or both of the LLC 125 and the snoop filter 116 as will be discussed in more detail with reference to FIG. 2A through FIG. 6.

The hardware virtualization support circuit 126 (FIG. 1B) may support virtualized execution of operating systems, applications, and other software by the computing system 100. The hardware virtualization support circuit 126 may include virtual machine extensions (VMX) support by providing two modes of execution: VMX-root mode and VMX non-root mode. The VMX-root mode allows executing software to have broad control of the computing system 100 and its hardware resources. Conversely, a hypervisor, the VMM 110, or host operating system (OS) may execute in VMX-root mode. The VMX non-root mode restricts access to certain hardware instructions while still implementing the ordinary ring/privilege system of the processor core. One or more guest OSs (e.g., of the VMs) may execute in the VMX non-root mode. Those guest OSs may execute in ring zero, similar to being executed without virtualization. The hardware virtualization support circuit 126 may also support extended page tables (EPT), which may be embodied as hardware-assisted second-level page address translation. The hardware virtualization support circuit 126 may be embodied as, for example, Intel® VT-x technology.

The memory 132 (e.g., main memory) may be embodied a type of volatile or non-volatile memory or other data storage capable of functioning as main memory. In operation, the memory 132 may store various data and software used during operation of the computing system 100 such as operating systems, applications, programs, libraries, and drivers. The memory controller 122 may be coupled to the memory 132 to store to and fetch from the memory, which in some cases may depend on misses to the cache 118, the LLC 125, and the snoop filter 116.

As discussed, the MK-TME engine 124 may assign different keys to different programs. For example, each VM controlled by the VMM may be assigned a unique key. Accordingly, the code and data of a VM cannot be accessed by another VM. The memory controller 122 may use key IDs to do encryption and decryption using keys corresponding to the key IDs for those programs. One way to manage key access is to append each key ID 158 to the upper-most (or most significant) bits of a physical address 156 in main memory that the memory controller can check, e.g., as illustrated in FIG. 1C. Bits of the key ID 158 and the physical address 156 may then make up an address tag 160 that will be processed by a cache controller within a memory management system. In other implementations, each key ID 158 is integrated or associated with the physical address 156 in another way, e.g., within a different series of bits of the physical address or stored in relation to the physical address 156.

When a memory transaction (such as a load or a store operation) reaches the memory controller 122, the memory controller 122 may strip out or otherwise access the upper-most (or key ID 158) bits of the physical address 156 and use these bits to identify the key with which to encrypt or decrypt the data associated with the memory transaction. In implementations, the MK-TME engine 124 performs the key ID access and correlation to a unique key associated with that key ID for use in encryption or decryption. For example, the MK-TME engine 124 may store a list (or table or the like) in a key data structure in which key IDs are correlated to different keys that are to be used for secure domains that are to be cryptographically isolated. The MK-TME engine 124 may use up to the six top-most bits of the physical address as the key ID, up to seven of the top-most bits of the physical address as the key ID, or some other number depending on the number of unique keys that are to be correlated to a corresponding number of unique key IDs. In another embodiment, the MK-TME engine 124 may be directly provided the key ID, and may thus not be a part of the physical address. For a computing system that employs hundreds of keys, at least some of the data within the key data structure may be encrypted and stored in the memory 132 using a key only known to the MK-TME engine.

The secondary storage device 134 may be embodied as any type of device or devices configured for short-term or long-term storage of data such as, for example, memory devices and circuits, memory cards, hard disk drives, solid-state drives, or other data storage devices. In some implementations, the memory controller 122 may retrieve data from the secondary storage device 134 that is not yet present in the memory 132 or in one of the caches discussed herein.

The communication circuitry 136 of the computing system 100 may be embodied as any communication circuit, device, or collection thereof, capable of enabling communications between the computing system 100 and other remote devices over a network. The communication circuitry 136 may be configured to use any one or more communication technology (e.g., wired or wireless communications) and associated protocols (e.g., Ethernet, Bluetooth®, Wi-Fi®, WiMAX, etc.) to effect such communication.

In some implementations, the computing system 100 may include the security engine 138, which may be embodied as any hardware component(s) or circuitry capable of providing security-related services to the computing system 100. In particular, the security engine 138 may include a microprocessor, microcontroller, or other embedded controller capable of executing firmware and/or other code independently and securely from the processor core. Thus, the security engine 138 may be used to establish a trusted execution environment separate from code executed by the processor core 120. The security engine 138 may communicate with the processor core 120 and/or other components of the computing system 100 over a dedicated bus, such as a host embedded controller interface (HECI). The security engine 138 may also provide remote configuration, control, or management of the computing system 100. In one implementation, the security engine 138 is embodied as a converged security and manageability engine (CSME) incorporated in a system on a chip (SoC) of the computing system 100. In additional or alternative implementations, the security engine 138 may be embodied as a manageability engine, an out-of-band processor, a Trusted Platform Module (TPM), or other security engine device or collection of devices. Further, in some implementations, the security engine 138 is also capable of communicating using the communication circuitry 136 or a dedicated communication circuit independently of the state of the computing system 100 (e.g., independently of the state of the processor core 120A), also known as "out-of-band" communication.

With additional reference to FIG. 1A, the memory 132 may include any type of persistent or non-volatile media, such as a flash memory device, a solid-state device (SSD), a memristor, phase change memory (e.g., PCS, PCM, PCME, PCRAM, Ovonic Unified Memory, Chalcogenide RAM, C-RAM, etc.), or other storage or memory device. The memory 132 may store instructions and/or data represented by data signals that are to be interpreted and/or executed by the processor cores. In some implementations, the memory 132 is a dual-inline memory module (DIMM). The memory 132 may also include volatile memory, such as in the form of random access memory (RAM) or registers.

Figure 2A:
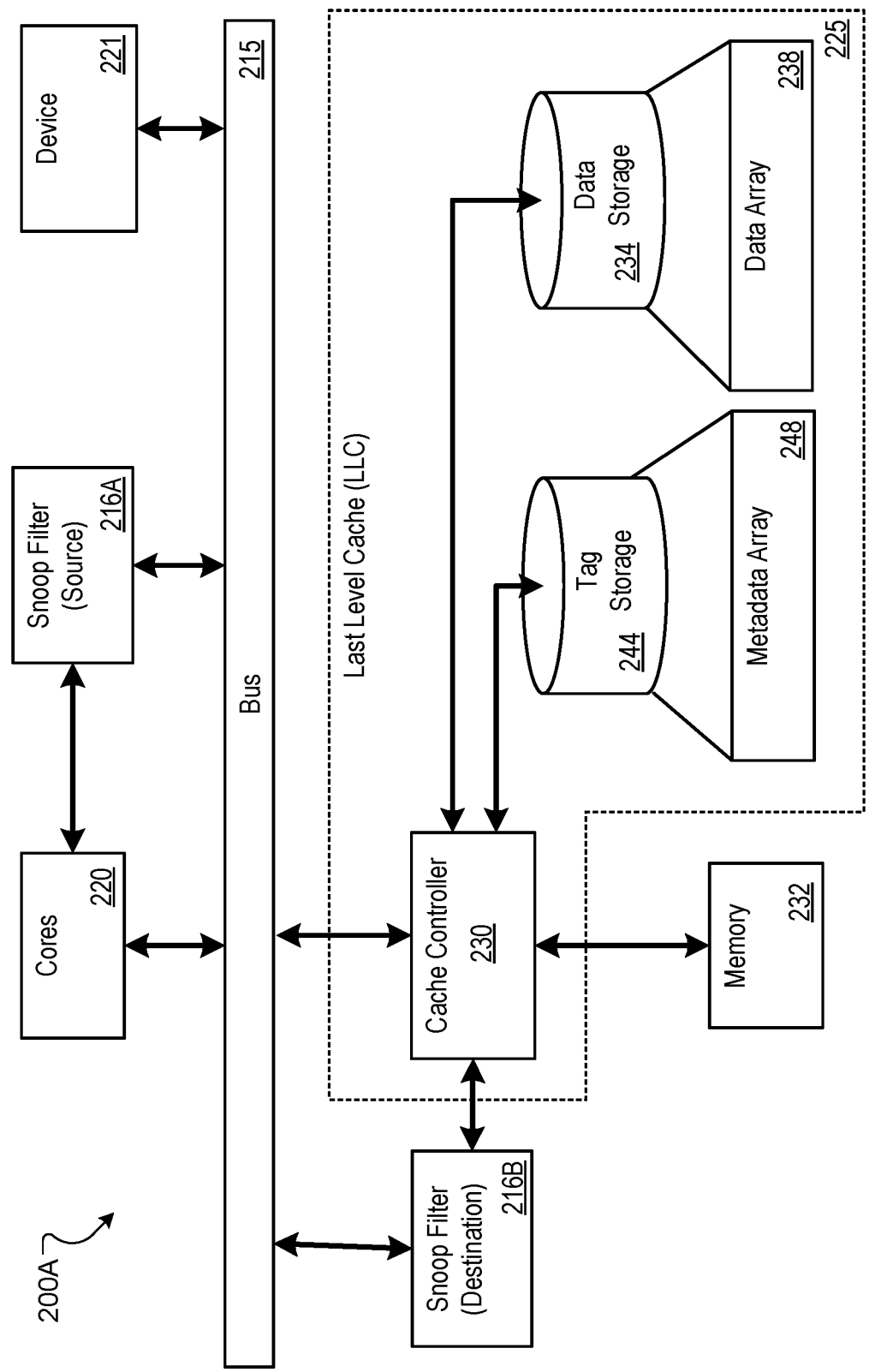
FIG. 2A is a block diagram of example system architecture to implement write-back invalidate by key identifier according to an implementation.
Figure 2B:
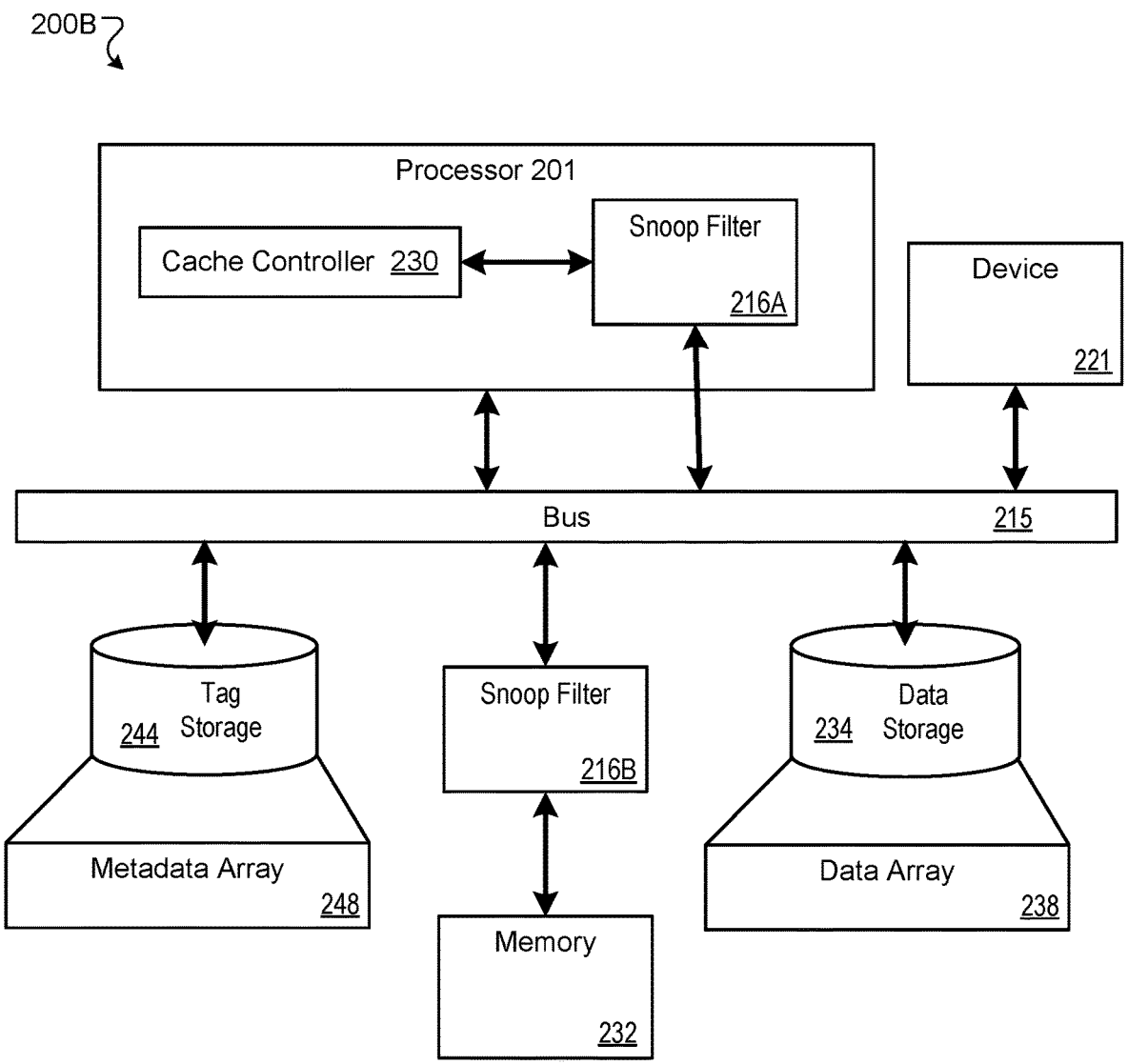
FIG. 2B is a block diagram of example system architecture to implement write-back invalidate by key identifier according to another implementation.
Figure 2C:
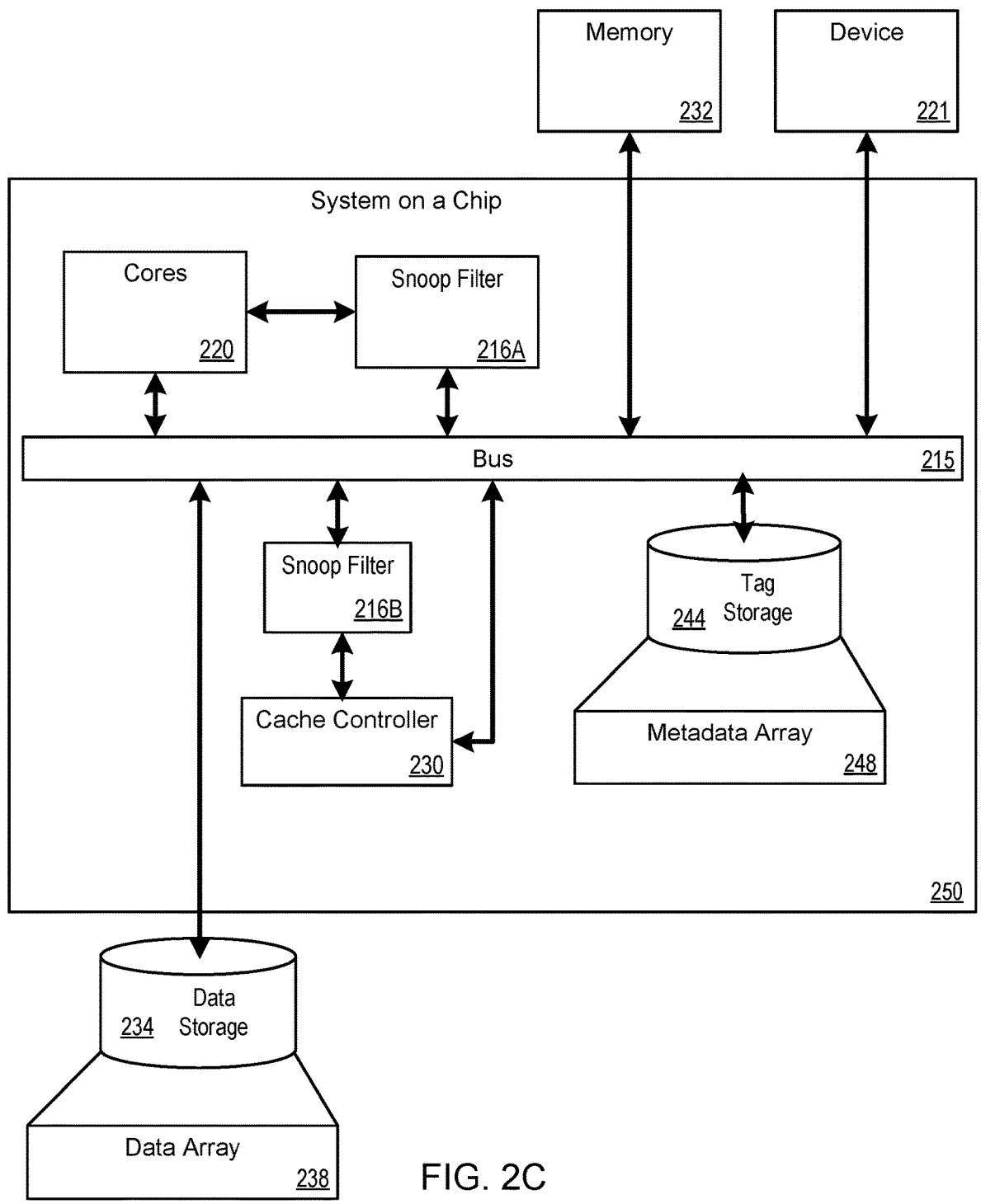
FIG. 2C is a block diagram of example system on a chip (SoC) to implement write-back invalidate by key identifier according to still another implementation.

The processor core 120A may be coupled to the memory 132 via a processing device bus (see bus 215 in FIGS. 2A-2C). A system logic chip, such as a memory controller hub (MCH) may be coupled to the processing device bus and the memory 132. An MCH can provide a high bandwidth memory path to the memory 132 for instruction and data storage and for storage of graphics commands, data, and textures. The MCH may be used to direct data signals between the processor core 120A, the memory 132, and other components in the computing system 100 and to bridge the data signals between processing device bus, the memory 132, and system I/O, for example. The MCH may be coupled to the memory 132 through a memory interface. In some implementations, the system logic chip can provide a graphics port for coupling to a graphics controller through an Accelerated Graphics Port (AGP) interconnect.

The computing system 100 may also include an I/O controller hub (ICH). The ICH can provide direct connections to some I/O devices (see device 221 in FIGS. 2A-2C) via a local I/O bus. The local I/O bus is a high-speed I/O bus for connecting peripherals to the memory 132, chipset, and processor 101. Some examples are the audio controller, firmware hub (flash BIOS), wireless transceiver, data storage, legacy I/O controller containing user input and keyboard interfaces, a serial expansion port such as Universal Serial Bus (USB), and a network controller. The data storage device can comprise a hard disk drive, a floppy disk drive, a CD-ROM device, a flash memory device, or other mass storage device.

With further reference to the LLC 125 and the snoop filter 116, integrated circuits that provide the system architecture of the computing system 100 may employ a cache controller to allocate entries to set-associative, memory-side cache, which includes data storage for a plurality of sets of ways. The cache controller may allocate memory within set-associative cache by selecting a way from an appropriate set to which to allocate new entries in the set-associative cache. Different implementations of such system architecture are discussed with reference to FIGS. 2A-2C.

FIG. 2A is a block diagram of example system architecture 200A to implement write-back invalidate by key identifier according to an implementation. The system architecture 100 may include multiple cores 220 coupled to a memory 232 (such as the memory 132 of the computing system 100) through a cache controller 230 of a last level cache (LLC) 225 via a bus 215. The system architecture 200A may further include a snoop filter 216A and/or 216B (like the snoop filter 116 of the computing system 100), that may index address tags and other metadata of the caches of the multi-core processor, thus tracking the location of cached data throughout the computing system 100. As such, the snoop filter does not store the data itself, which is stored in the cache lines of the caches. In one embodiment, the snoop filter 216A is a source snoop filter located between the multiple cores 220 and the bus 215, to snoop coherency traffic between the multiple cores 220 and the rest of the computing system 100. Furthermore, the snoop filter 216B may be a destination snoop filter located between the bus 215 and the cache controller 230 to snoop coherency traffic between the bus 215 and the LLC 225.

The system architecture 200A may also include a device 221 (e.g., an I/O device) coupled to the processor 201 through the bus 215. The device 221 may be a device (e.g., an input-output (I/O) device), a driver belonging to an I/O device, or software program capable of accessing (e.g., reading from, writing to) the memory 232. When the device is a driver, the driver may be running on a core even though the driver belongs to an I/O device. An example of the device 221 may include a graphics device or graphics driver. The device 221 may receive or be assigned a memory address, multiple memory addresses, a block of memory address, or multiple blocks of memory addresses (hereafter referred to collectively as "an address"). For example, an operating system (not shown) may assign the device 221 an address to use during operation. Alternatively, the device 221 may arbitrarily select an address from a list of available memory addresses.

The system architecture 200A may also include a last level cache (LLC) 225 (e.g., like the LLC 125 of the computing system 100) interposed between the bus 215 and the memory 232 that inspects and is able to act on transactions directed to the memory 232. The LLC 225 may include, but not be limited to, a cache controller 230, a data storage structure 234 in which is stored a data array 238 (to store data of cache lines), and a tag storage structure 244 in which is stored a metadata array 248 (to store metadata of the cache lines). The metadata may include address tags, and other coherency bits such as dirty and invalid bits associated with particular address tags. In some implementations, the tag storage structure 244 and the data storage structure 234 may be combined. The makeup of the snoop filter 216A or 216B may be similar to that of the tag storage structure 244. In that sense, the LLC 225 and the snoop filters 216A and 216B are content-addressable memory (CAM) in some implementations.

The LLC 225 is shown as a single-level memory-side cache, as is the snoop filter 216B, although the techniques described may be applied to one or more levels of cache within one or more cores, a set of one or more shared cache units and the memory 232. The set of shared cache units may include one or more mid-level caches, such as level 2 (L2), level 3 (L3), level 4 (L4), or other levels of cache, LLC, and/or combinations thereof. Any number of cache configurations and cache sizes are contemplated. Depending on the architecture, the LLC 225 may be a single internal cache located on an integrated circuit or may be multiple levels of internal caches on the integrated circuit. For configurations with multiple cache levels, the caches may be configured to be inclusive or non-inclusive. Other embodiments include a combination of both internal and external caches depending on particular embodiments.

Caches may be configured in different schemes, generally referred to as direct mapped, fully associative and set-associative. The LLC 225 may be a set-associative cache for purposes of the present disclosure, and thus include one or more cache ways organized within cache sets into which the cache is divided. Each cache way may include a metadata block that includes an address reference (e.g., tag) to actual data fetched from the memory 232, and a data block that contains data fetched from the memory. A combination of the metadata and the data for a particular cache entry may be referred to as a cache line.

Set-associative cache is a hybrid between a fully associative cache and direct-mapped cache. Caches are generally divided into multiple equal sections called cache ways (or slots or blocks). A set-associative scheme works by grouping the cache ways into sets to create a set-associative scheme, where each set corresponds to a set of main memory locations. For example, the memory 232 can have 1,000 memory locations and may be divided into four sets. A first set of the main memory locations can include locations 1-250, a second set of the main memory locations may include locations 251-500, and so forth. The set-associative cache may have 200 ways that can be grouped into 4 sets of 50 ways, where each set of ways corresponds to a set of main memory locations. For example, a first set of ways can include 50 ways in which data from any of the first set of the main memory locations (memory locations 1-250) can be stored. In common implementations, grouping of the main memory locations into sets is done using a modulus function, such that, for example, the first set of 250 memory locations contains locations 1, 5, 9 . . . and the second set of 250 memory locations contains locations 2, 6, 10, and so forth.

A set-associative scheme is considered a reasonable compromise between the power-hungry hardware needed for fully associative caches (which requires parallel searches of all ways) and the simplistic direct-mapped scheme, which may cause collisions of addresses to the same way (similar to collisions in a hash table). The fewer ways needed to be searched, the less hardware is required. Common choices, therefore, include 4-way or 8-way associative caches in which sets are groups of four or eight ways, respectively. So, in a cache with 128 ways and 8 ways per set, there are 16 sets, for example, which may be numbered 0 to 15. An individual way within the cache may be referenced by the set number and by the way within the set, for example "set 14, way 5."

FIG. 2B is a block diagram of example system architecture 200B to implement write-back invalidate by key identifier according to another implementation. The system architecture 200B may include the same components as the system architecture 200A of FIG. 2A, except that the cache controller 230 of the LLC 225 and the snooper filter 216A are located within a processor 201. Furthermore, the data storage structure 234 and the tag storage structure 244 may be distributed at different locations along the bus 215. The snoop filter 216B may further be located between the bus 215 and the memory 232.

FIG. 2C is a block diagram of example system on a chip (SoC) 250 to implement write-back invalidate by key identifier according to still another implementation. In this implementation, the data storage structure 234 may be located outside of the SoC 250, e.g., where the data storage structure 234 is larger and located memory-side to the memory 232. The snoop filter 216A may still be employed, coupled between the multiple cores 220 and the bus 215. Furthermore, the cache controller 230 and the snoop filter 216B may be integrated separately or together within the SoC 250 and be coupled directly to the bus 215 in order to direct caching activity between the memory 232 and the data storage structure 234. The tag storage structure 244 and the snoop filter 216B may still be located on the SoC 250, to ensure quick cache line searches for cache hits within the caches, including the LLC, of the computing system 100. Different combinations and layouts of the components of architectures of FIGS. 2A, 2B, and 2C are envisioned and these architectures are illustrated by way of example.

When the cache controller 230 receives a transaction from the memory controller 122 or the core 120A, the cache controller 230 can match the address tag of the transaction to entries within the tag storage structure 244. In case of a non-inclusive LLC, the snoop filter 216 may receive a transaction from the memory controller 122 or the core 120A with the address tag. Upon finding a match, the cache controller 230 may complete the transaction, facilitating a read operation or a store operation to or from the memory 232 with reference to cache lines in the data storage structure 234.

In implementations, now that a key ID is appended to the physical address, the search within the tag storage structure 244 (or the snoop filter 216A or 216B) may be a key-ID-specific search of the address tags, e.g., partial matches of the address tags. In one implementation, the cache controller 230 may receive a transaction from the core 120A in response to execution of the WBINVD-BY-KEYID instruction by the core 120A, where both the instruction and the resultant transaction include the key ID. This transaction may cause the cache controller to do a partial match of the key ID (KEYID_TO_FLUSH) in the transaction with the key identifier portions of the address tags in the tag storage structure 244 (or snoop filter 216). The transaction may cause the search to iterate through sets of the LLC 225 or the snoop filter 216A or 216B until one or more ways of a particular set are identified as hits for the key ID. The cache controller may, in response to the transaction, provide a vector of ways that match the key ID to the core 120A. In this way, the core 120A may identify the sets and ways within the LLC (and/or snoop filter) to target for purposes of finding the particular cache lines with an old key ID to invalidate.

The below is exemplary pseudo code of how the transaction may be performed by the core 120A, which may be implemented via microcode or other WBINVD-BY-KEYID logic. This first type of transaction may include the key ID to flush within an operand of the transaction sent to the LLC 125 or 225.

```
For max_sets_in_LLC
    match_ways := lookup_LLC_set_by_KID(KEYID_TO_FLUSH)
    way_number = 0
    WHILE (match_ways != 0 ) {
        IF ( match_ways & 0x01)
            llc_wbinvd(set_number, way_number)
        match_ways = match_ways >> 1;
        way_number++;
    ENDWHILE
ENDIF
```

The below is exemplary pseudo code of how the first type of transaction may be performed by the core 120A, to cause the snoop filter to perform a cache flush according to the key ID included within the transaction sent to the snoop filter.

```
For max_sets_in_SnoopFilter
    match_ways := lookup_SF_set_by_KID(KEYID_TO_FLUSH)
    way_number = 0
    WHILE (match_ways != 0 )
        IF ( match_ways & 0x01)
            SF_wbinvd(set_number, way_number)
        match_ways = match_ways >> 1;
        way_number++;
    ENDWHILE
ENDIF
```

Now that the core 120A knows the vector of ways that include the cache lines for invalidations, the core 120A may send a write-back-invalidate (WBINVD) transaction to the LLC (or snoop filter) that includes a set number of the set, a way number from among the vector of ways, and the first key identifier specified by microcode. Responsive to the write-back-invalidate transaction, the cache controller (or snoop filter) may compare the first key identifier to a key identifier portion of the address tag corresponding to the set number and the way number. Further, responsive to finding matching entries between the first key identifier and the key identifier portion in the set and way identified in the WBINVD transaction, the cache controller (or snoop filter) may perform the write back and invalidate of the cache lines corresponding to the matching entries in the LLC (or the snoop filter).

FIG. 3 is a block diagram of the tag storage structure 244 of the system architectures of any of FIGS. 2A-2C according an implementation. In this implementation, the tag storage structure 244 may be partitioned into a key identifier cache (KIC) 244A and a metadata storage structure 244B. The KIC 244A may store the key IDs separate from corresponding address tags and coherency bits of the metadata storage structure 244B.

In an alternative implementation to the above pseudo-code, instead of reaching back the vector of ways of a set, which may be repeated for multiple sets in which ways are found to match, the core 120A may send the key ID (KEYID_TO_FLUSH) to the LLC and/or snoop filter in the write-back-invalidate (WBINVD) transaction. In this alternative implementation, the LLC and/or snoop filter may only perform the WBINVD transaction if the key ID specified in the transaction matches the key ID in the tag or in the KIC 244A. In this way, the transaction causes the cache controller to do a lookup and partial match of the key ID with the intention of also writing back and invalidating any cache lines that are a match.

More specifically, in response to the core 120A executing microcode or other logic of the WBINVD-BY-KEYID instruction that includes the first key ID, the core 120 may send the first key ID (e.g., the KEYID_TO_FLUSH) within a write-back-invalidate transaction to the LLC (and/or snoop filter). Responsive to the write-back-invalidate (WBINVD) transaction, the cache controller 230 is to identify matching entries in the LLC by comparison of the first key identifier with at least part of an address tag of multiple entries in a tag storage structure of the LLC. The matching entries are associated with cache lines of the LLC. The cache controller may further write back, to the memory, data stored in the cache lines and mark the matching entries of the tag storage structure as invalid, e.g., which causes invalidation of the set of cache lines.

To perform the WBINVD-BY-KEYID instruction as a single transaction, the core 120A may perform microcode (or other logic) according to the following pseudo code, to cause the LLC to perform a flush loop of the LLC. The LLC may perform the flush within an identified set and way of the LLC if that line has the key ID identified by the KEYID_TO_FLUSH.

```
For max_sets_in_LLC
    For max_ways_in_LLC
        llc_wbinvd_by_keyid(set_number, way_number,
    KEYID_TO_FLUSH)
    ENDWHILE
ENDIF
```

To perform the WBINVD-BY-KEYID instruction as a single transaction, the core 120A may perform microcode (or other logic) according to the following pseudo code, to cause the snoop filter to perform a flush loop of multiple caches. The snoop filter may perform the flush within an identified set and way of the snoop filter if that line has the key ID identified by the KEYID_TO_FLUSH.

```
For max_sets_in_SnoopFilter
    For max_ways_in_SnoopFilter
```

```
        sf_wbinvd_by_keyid(set_number, way_number,
KEYID_TO_FLUSH)
        ENDWHILE
    ENDIF
```

FIG. 4 is a block diagram of an example caching and home agent (CHA) 400 according to an implementation. The CHA 400 may include a snoop filter 416, an LLC 425, and a keyID cache (KIC) 444A. The CHA 400 may be viewed as an extension of the tag storage structure 244 of FIG. 3, in which the key IDs are all indexed within the KIC 444A for both the snoop filter 416 and the tag storage structure of the LLC 425. In this way the KIC 444A operates as an index of a second tag on the cache lines currently cached in a coherent domain.

Figure 1B:
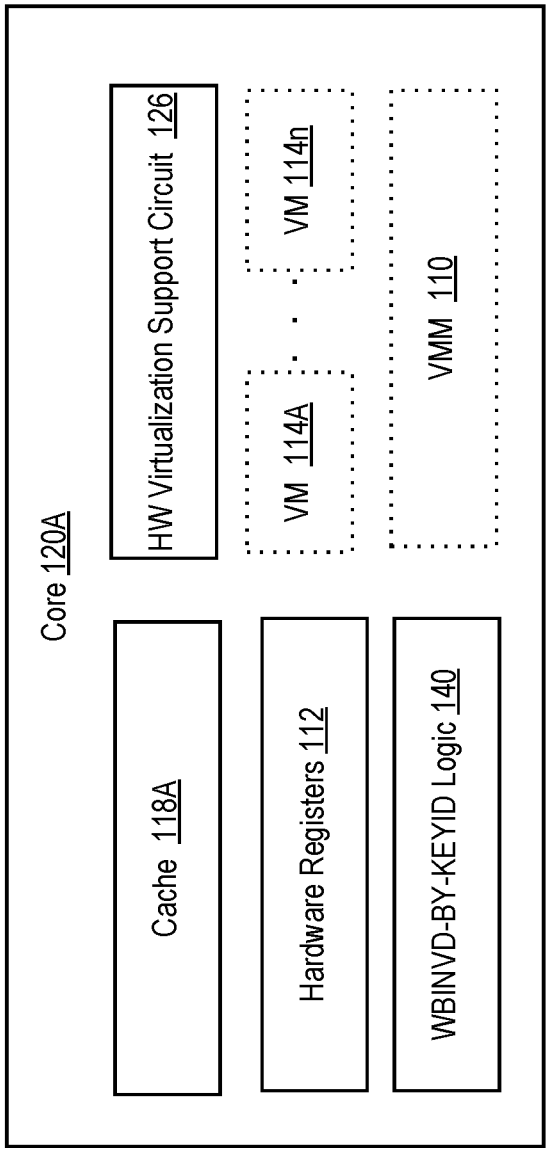
Figure 1C:
FIG. 1C is a block diagram representative of a physical memory address with a key ID appended as most-significant bits of the physical memory address according to an implementation.

In various implementations, the snoop filter 416 and LLC 415 lookups may be compared to both the physical address tag and the key ID tag illustrated in FIG. 1B. If there is a miss due to not matching the physical address, then a victim cache line may be selected, e.g., using least recently used (LRU) and replacement performed. If the miss was due to matching physical address tag but not key ID, then the cache line that matched the physical address tag is picked as victim and is evicted and replaced by the new request. Two cache lines in a coherent subsystem may not have the same physical address but different key ID tag, so there may be only one line that matches the physical address, but not the key ID tag. If physical address tag and key ID tag match, then this is a cache hit, and the access may be completed in the cache.

Figure 5:
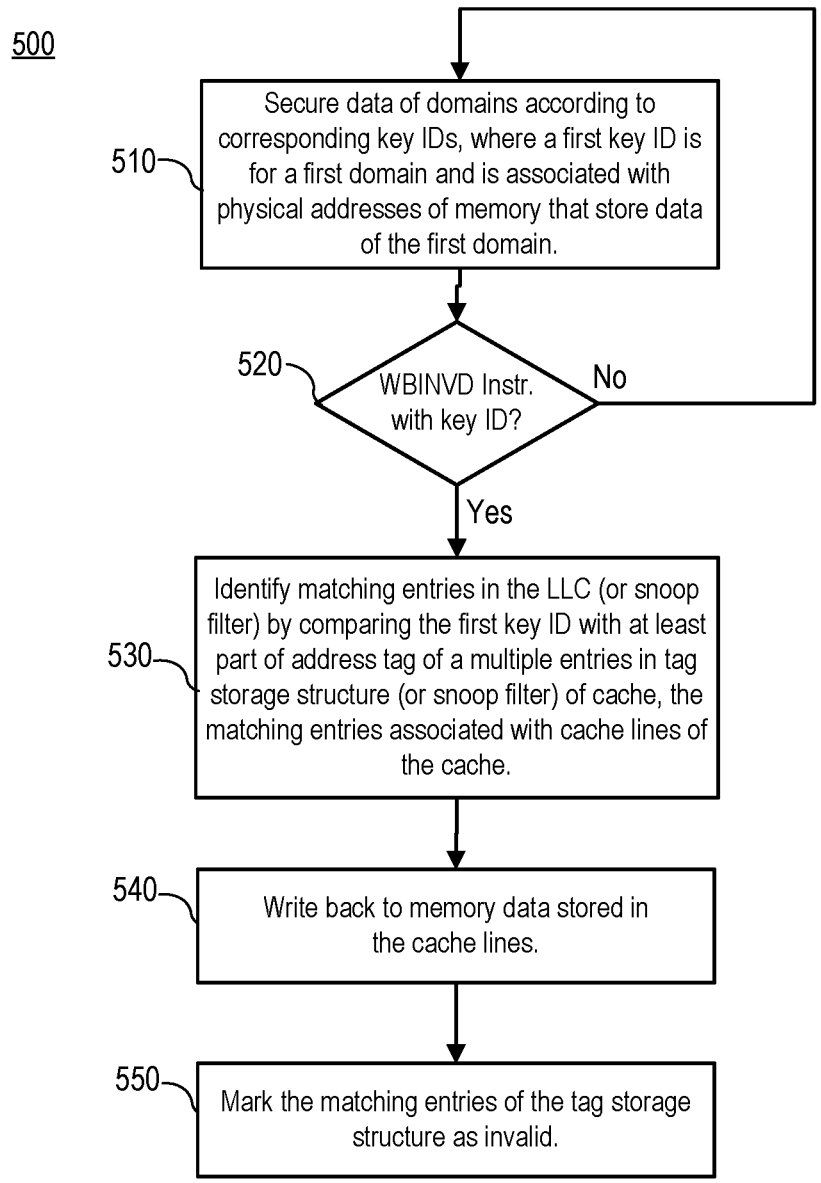
FIG. 5 is a flow chart of a method for write-back invalidation by key identifier, according to various implementations.

FIG. 5 is a flow chart of a method 500 for write-back invalidation by key identifier, according to various implementations. In various implementations, the method 500 may be performed by processing logic that may comprise hardware (e.g., circuitry, dedicated logic, programmable logic, microcode, etc.), firmware, or a combination thereof. In one implementation, the method 500 is performed by the computing system 100 of FIG. 1, to include the processor core 120A, the memory controller 122, the LLC 125, and/or the snoop filter 116, 216A, or 216B. In another implementation, the method 500 is performed by any of the system architectures 200A, 200B, and 200C of FIGS. 2A-2C, or by any of the integrated circuits, processors, or systems described herein.

With reference to FIG. 5, the method 500 may begin with the processing logic securing data of multiple domains according to corresponding key identifiers, wherein a first key identifier for a first domain of the programs is associated with physical addresses of memory that store data of the first domain (510). The method 500 may continue with the processing logic determining whether an instruction (e.g., the WBINVD-BY-KEYID instruction) has been executed (520). For example, whether a processor core coupled to a memory controller has executed the instruction, which includes the first key identifier, to generate a transaction that also includes the first key identifier, wherein the instruction is to flush and invalidate cache lines associated with the first key identifier. If no, e.g., no flushing transaction has been generated, the method 500 may loop back to block 510 and continue monitoring for execution of the instruction.

If yes, the method 500 may continue with the processing logic identifying matching entries in the LLC (or snoop filter) by comparing the first key identifier with at least part of an address tag of multiple entries in a tag storage structure (or the snoop filter) of the LLC, the matching entries associated with cache lines of the LLC (or multiple levels of cache for a multi-core processor in the case of the snoop filter) (530). To do so, the processing logic (e.g., of the core) may generate a number of different transactions to be sent to the cache. These transactions were discussed previously. Once the cache lines are identified, the method 500 may continue with the processing logic writing back, to the memory, data stored in the cache lines (540). The method 500 may continue with the processing logic marking the set of entries of the tag storage structure as invalid (550). These last two steps may complete the flush and invalidations of the cache lines according to key identifier.

FIG. 6A is a block diagram illustrating a micro-architecture for a processor 600 that implements write-back invalidation by key identifier, according to an implementation. Specifically, processor 600 depicts an in-order architecture core and a register renaming logic, out-of-order issue/execution logic to be included in a processor according to at least one implementation of the disclosure.

Processor 600 includes a front end unit 630 coupled to an execution engine unit 650, and both are coupled to a memory unit 670. The processor 600 may include a reduced instruction set computing (RISC) core, a complex instruction set computing (CISC) core, a very long instruction word (VLIW) core, or a hybrid or alternative core type. As yet another option, processor 600 may include a special-purpose core, such as, for example, a network or communication core, compression engine, graphics core, or the like. In one implementation, processor 600 may be a multi-core processor or may be part of a multiprocessor system.

The front end unit 630 includes a branch prediction unit 632 coupled to an instruction cache unit 634, which is coupled to an instruction translation lookaside buffer (TLB) 636, which is coupled to an instruction fetch unit 638, which is coupled to a decode unit 640. The decode unit 640 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 640 may be implemented using various different mechanisms. Examples of suitable mechanisms include, but are not limited to, look-up tables, hardware implementations, programmable logic arrays (PLAs), microcode read only memories (ROMs), etc. The instruction cache unit 634 is further coupled to the memory unit 670. The decode unit 640 is coupled to a rename/allocator unit 652 in the execution engine unit 650.

The execution engine unit 650 includes the rename/allocator unit 652 coupled to a retirement unit 654 and a set of one or more scheduler unit(s) 656. The scheduler unit(s) 656 represents any number of different scheduler circuits, including reservations stations (RS), central instruction window, etc. The scheduler unit(s) 656 is coupled to the physical register set(s) unit(s) 658. Each of the physical register set(s) units 658 represents one or more physical register sets, different ones of which store one or more different data types, such as scalar integer, scalar floating point, packed integer, packed floating point, vector integer, vector floating point, etc., status (e.g., an instruction pointer that is the address of the next instruction to be executed), etc. The physical register set(s) unit(s) 658 is overlapped by the retirement unit 654 to illustrate various ways in which register renaming and out-of-order execution may be implemented (e.g., using a reorder buffer(s) and a retirement register set(s), using a future file(s), a history buffer(s), and a retirement register set(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 654 and the physical register set(s) unit(s) 658 are coupled to the execution cluster(s) 660. The execution cluster(s) 660 includes a set of one or more execution units 662 and a set of one or more memory access units 664. The execution units 662 may perform various operations (e.g., shifts, addition, subtraction, multiplication) and operate on various types of data (e.g., scalar floating point, packed integer, packed floating point, vector integer, vector floating point).

While some implementations may include a number of execution units dedicated to specific functions or sets of functions, other implementations may include only one execution unit or multiple execution units that all perform all functions. The scheduler unit(s) 656, physical register set(s) unit(s) 658, and execution cluster(s) 660 are shown as being possibly plural because certain implementations create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register set(s) unit, and/or execution cluster—and in the case of a separate memory access pipeline, certain implementations are implemented in which only the execution cluster of this pipeline has the memory access unit(s) 664). It should also be understood that where separate pipelines are used, one or more of these pipelines may be out-of-order issue/execution and the rest in-order.

The set of memory access units 664 is coupled to the memory unit 670, which may include a data prefetcher 680, a data TLB unit 672, a data cache unit (DCU) 674, and a level 2 (L2) cache unit 676, to name a few examples. In some implementations DCU 674 is also known as a first level data cache (L1 cache). The DCU 674 may handle multiple outstanding cache misses and continue to service incoming stores and loads. It also supports maintaining cache coherency. The data TLB unit 672 is a cache used to improve virtual address translation speed by mapping virtual and physical address spaces. In one exemplary implementation, the memory access units 664 may include a load unit, a store address unit, and a store data unit, each of which is coupled to the data TLB unit 672 in the memory unit 670. The L2 cache unit 676 may be coupled to one or more other levels of cache and eventually to a main memory.

In one implementation, the data prefetcher 680 speculatively loads/prefetches data to the DCU 674 by automatically predicting which data a program is about to consume. Prefetching may refer to transferring data stored in one memory location (e.g., position) of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 600 may support one or more instructions sets (e.g., the x86 instruction set (with some extensions that have been added with newer versions); the MIPS instruction set of Imagination Technologies of Kings Langley, Hertfordshire, UK; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated implementation of the processor also includes a separate instruction and data cache units and a shared L2 cache unit, alternative implementations may have a single internal cache for both instructions and data, such as, for example, a Level 1 (L1) internal cache, or multiple levels of internal cache. In some implementations, the system may include a combination of an internal cache and an external cache that is external to the core and/or the processor. Alternatively, all of the cache may be external to the core and/or the processor.

FIG. 6B is a block diagram illustrating an in-order pipeline and a register renaming stage, out-of-order issue/execution pipeline implemented by processor 600 of FIG. 6A according to some implementations of the disclosure. The solid lined boxes in FIG. 6B illustrate an in-order pipeline 601, while the dashed lined boxes illustrate a register renaming, out-of-order issue/execution pipeline 603. In FIG. 6B, the pipelines 601 and 603 include a fetch stage 602, a length decode stage 604, a decode stage 606, an allocation stage 608, a renaming stage 610, a scheduling (also known as a dispatch or issue) stage 612, a register read/memory read stage 614, an execute stage 616, a write back/memory write stage 618, an exception handling stage 620 and a commit stage 622. In some implementations, the ordering of stages 602-622 may be different than illustrated and are not limited to the specific ordering shown in FIG. 6B.

Figure 7:
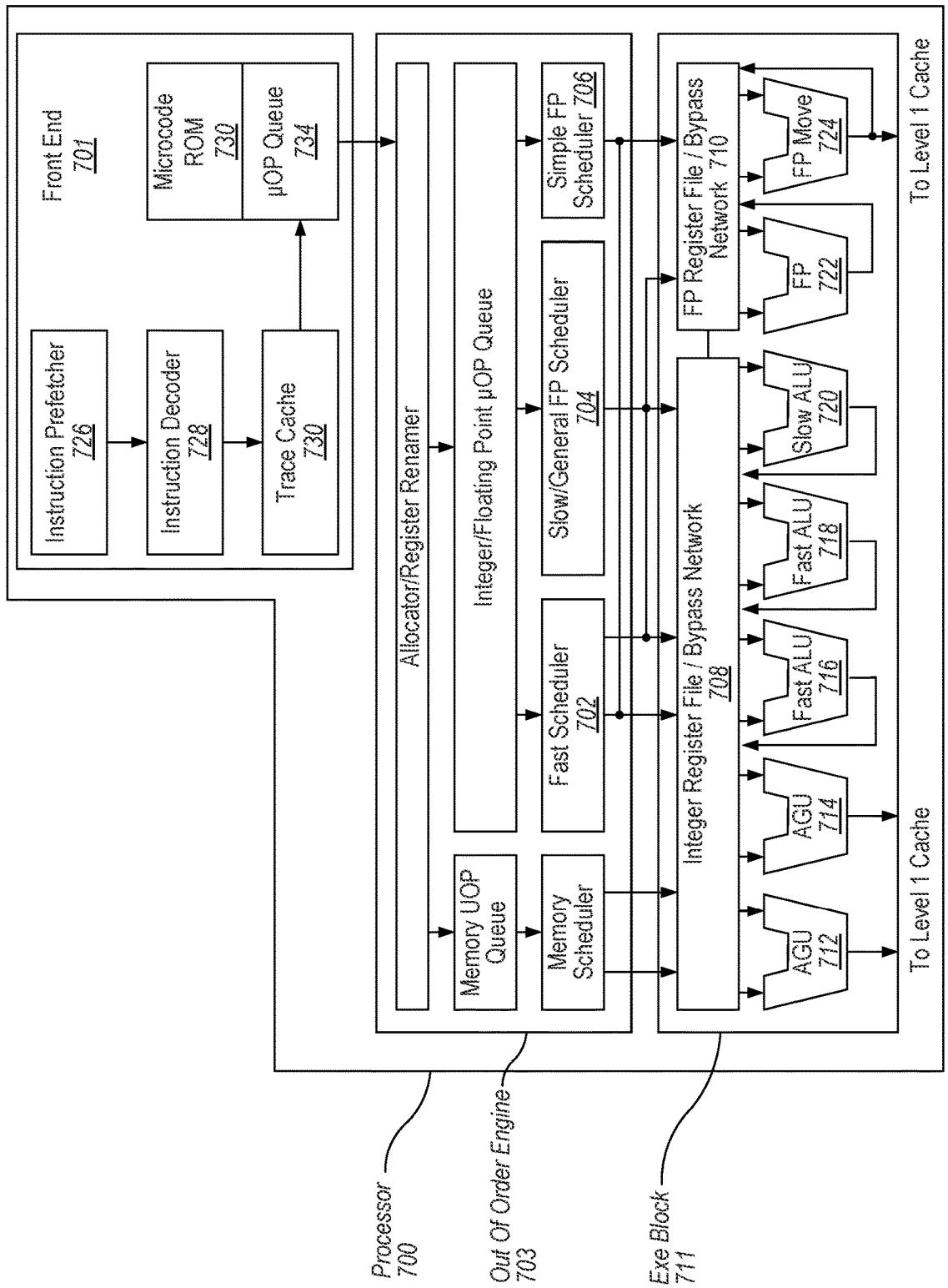
FIG. 7 illustrates a block diagram of the micro-architecture for a processor or an integrated circuit that implements write-back invalidation by key identifier, according to an implementation of the disclosure.

FIG. 7 illustrates a block diagram of the micro-architecture for a processor 700 that includes logic circuits of a processor or an integrated circuit that implements write-back invalidation by key identifier, according to an implementation of the disclosure. In some implementations, an instruction in accordance with one implementation can be implemented to operate on data elements having sizes of byte, word, doubleword, quadword, etc., as well as datatypes, such as single and double precision integer and floating point datatypes. In one implementation the in-order front end 701 is the part of the processor 700 that fetches instructions to be executed and prepares them to be used later in the processor pipeline. The implementations of the page additions and content copying can be implemented in processor 700.

The front end 701 may include several units. In one implementation, the instruction prefetcher 726 fetches instructions from memory and feeds them to an instruction decoder 728 which in turn decodes or interprets them. For example, in one implementation, the decoder decodes a received instruction into one or more operations called "micro-instructions" or "micro-operations" (also called micro op or uops) that the machine can execute. In other implementations, the decoder parses the instruction into an opcode and corresponding data and control fields that are used by the micro-architecture to perform operations in accordance with one implementation. In one implementation, the trace cache 730 takes decoded uops and assembles them into program ordered sequences or traces in the uop queue 734 for execution. When the trace cache 730 encounters a complex instruction, microcode ROM (or RAM) 732 provides the uops needed to complete the operation.

Some instructions are converted into a single micro-op, whereas others need several micro-ops to complete the full operation. In one implementation, if more than four micro-ops are needed to complete an instruction, the decoder 718 accesses the microcode ROM 732 to do the instruction. For one implementation, an instruction can be decoded into a small number of micro ops for processing at the instruction decoder 718. In another implementation, an instruction can be stored within the microcode ROM 732 should a number of micro-ops be needed to accomplish the operation. The trace cache 730 refers to an entry point programmable logic array (PLA) to determine a correct micro-instruction pointer for reading the micro-code sequences to complete one or more instructions in accordance with one implementation from the micro-code ROM 732. After the microcode ROM 732 finishes sequencing micro-ops for an instruction, the front end 701 of the machine resumes fetching micro-ops from the trace cache 730.

The out-of-order execution engine 703 is where the instructions are prepared for execution. The out-of-order execution logic has a number of buffers to smooth out and reorder the flow of instructions to optimize performance as they go down the pipeline and get scheduled for execution. The allocator logic allocates the machine buffers and resources that each uop needs in order to execute. The register renaming logic renames logic registers onto entries in a register set. The allocator also allocates an entry for each uop in one of the two uop queues, one for memory operations and one for non-memory operations, in front of the instruction schedulers: memory scheduler, fast scheduler 702, slow/general floating point scheduler 704, and simple floating point scheduler 706. The uop schedulers 702, 704, 706, determine when a uop is ready to execute based on the readiness of their dependent input register operand sources and the availability of the execution resources the uops need to complete their operation. The fast scheduler 702 of one implementation can schedule on each half of the main clock cycle while the other schedulers can only schedule once per main processor clock cycle. The schedulers arbitrate for the dispatch ports to schedule uops for execution.

Register sets 708, 710, sit between the schedulers 702, 704, 706, and the execution units 712, 714, 716, 718, 720, 722, 724 in the execution block 711. There is a separate register set 708, 710, for integer and floating point operations, respectively. Each register set 708, 710, of one implementation also includes a bypass network that can bypass or forward just completed results that have not yet been written into the register set to new dependent uops. The integer register set 708 and the floating point register set 710 are also capable of communicating data with the other. For one implementation, the integer register set 708 is split into two separate register sets, one register set for the low order 32 bits of data and a second register set for the high order 32 bits of data. The floating point register set 710 of one implementation has 128 bit wide entries because floating point instructions typically have operands from 64 to 128 bits in width.

The execution block 711 contains the execution units 712, 714, 716, 718, 720, 722, 724, where the instructions are actually executed. This section includes the register sets 708, 710, that store the integer and floating point data operand values that the micro-instructions need to execute. The processor 700 of one implementation is comprised of a number of execution units: address generation unit (AGU) 712, AGU 714, fast ALU 716, fast ALU 718, slow ALU 720, floating point ALU 712, floating point move unit 714. For one implementation, the floating point execution blocks 712, 714, execute floating point, MMX, SIMD, and SSE, or other operations. The floating point ALU 712 of one implementation includes a 64 bit by 64 bit floating point divider to execute divide, square root, and remainder micro-ops. For implementations of the disclosure, instructions involving a floating point value may be handled with the floating point hardware.

In one implementation, the ALU operations go to the high-speed ALU execution units 716, 718. The fast ALUs 716, 718, of one implementation can execute fast operations with an effective latency of half a clock cycle. For one implementation, most complex integer operations go to the slow ALU 720 as the slow ALU 720 includes integer execution hardware for long latency type of operations, such as a multiplier, shifts, flag logic, and branch processing. Memory load/store operations are executed by the AGUs 722, 724. For one implementation, the integer ALUs 716, 718, 720, are described in the context of performing integer operations on 64 bit data operands. In alternative implementations, the ALUs 716, 718, 720, can be implemented to support a variety of data bits including 16, 32, 128, 256, etc. Similarly, the floating point units 722, 724, can be implemented to support a range of operands having bits of various widths. For one implementation, the floating point units 722, 724, can operate on 128 bits wide packed data operands in conjunction with SIMD and multimedia instructions.

In one implementation, the uops schedulers 702, 704, 706, dispatch dependent operations before the parent load has finished executing. As uops are speculatively scheduled and executed in processor 700, the processor 700 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one implementation of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an implementation should not be limited in meaning to a particular type of circuit. Rather, a register of an implementation is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one implementation, integer registers store 32-bit integer data. A register set of one implementation also contains eight multimedia SIMD registers for packed data.

For the discussions herein, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one implementation, in storing packed data and integer data, the registers do not need to differentiate between the two data types. In one implementation, integer and floating point are either contained in the same register set or different register sets. Furthermore, in one implementation, floating point and integer data may be stored in different registers or the same registers.

Figure 8:
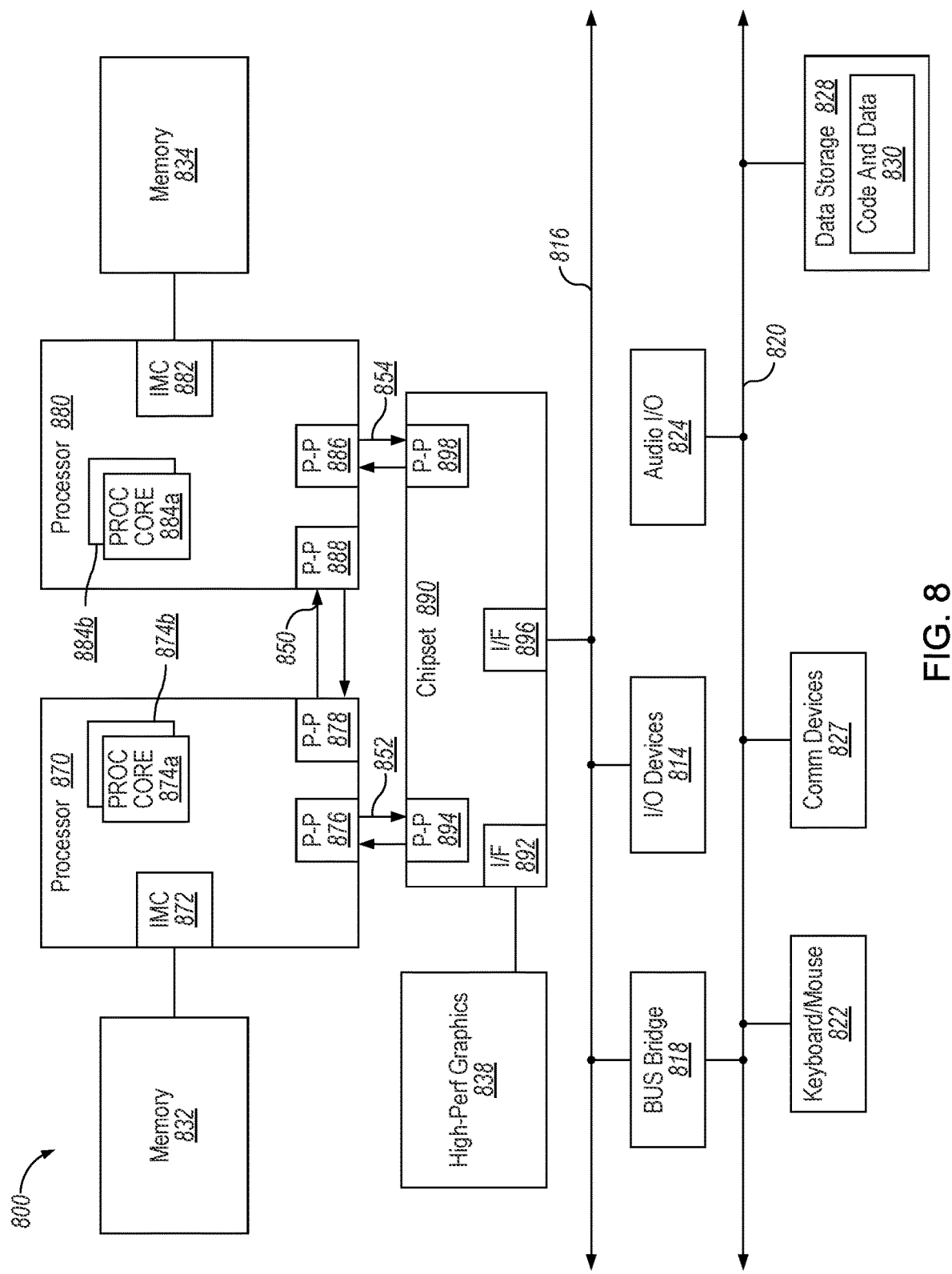
FIG. 8 is a block diagram of a computer system according to one implementation.

Implementations may be implemented in many different system types. Referring now to FIG. 8, shown is a block diagram of a multiprocessor system 800 that may implement hardware support for write-back invalidation by key identifier, in accordance with an implementation. As shown in FIG. 8, multiprocessor system 800 is a point-to-point interconnect system, and includes a first processor 870 and a second processor 880 coupled via a point-to-point interconnect 850. As shown in FIG. 8, each of processors 870 and 880 may be multicore processors, including first and second processor cores (i.e., processor cores 874a and 874b and processor cores 884a and 884b), although potentially many more cores may be present in the processors. While shown with two processors 870, 880, it is to be understood that the scope of the disclosure is not so limited. In other implementations, one or more additional processors may be present in a given processor.

Processors 870 and 880 are shown including integrated memory controller units 872 and 882, respectively. Processor 870 also includes as part of its bus controller units point-to-point (P-P) interfaces 876 and 888; similarly, second processor 880 includes P-P interfaces 886 and 888. Processors 870, 880 may exchange information via a point-to-point (P-P) interface 850 using P-P interface circuits 878, 888. As shown in FIG. 8, IMCs 872 and 882 couple the processors to respective memories, namely a memory 832 and a memory 834, which may be portions of main memory locally attached to the respective processors.

Processors 870, 880 may exchange information with a chipset 890 via individual P-P interfaces 852, 854 using point to point interface circuits 876, 894, 886, 898. Chipset 890 may also exchange information with a high-performance graphics circuit 838 via a high-performance graphics interface 839.

Chipset 890 may be coupled to a first bus 816 via an interface 896. In one implementation, first bus 816 may be a Peripheral Component Interconnect (PCI) bus, or a bus such as a PCI Express bus or interconnect bus, although the scope of the disclosure is not so limited.

Figure 9:
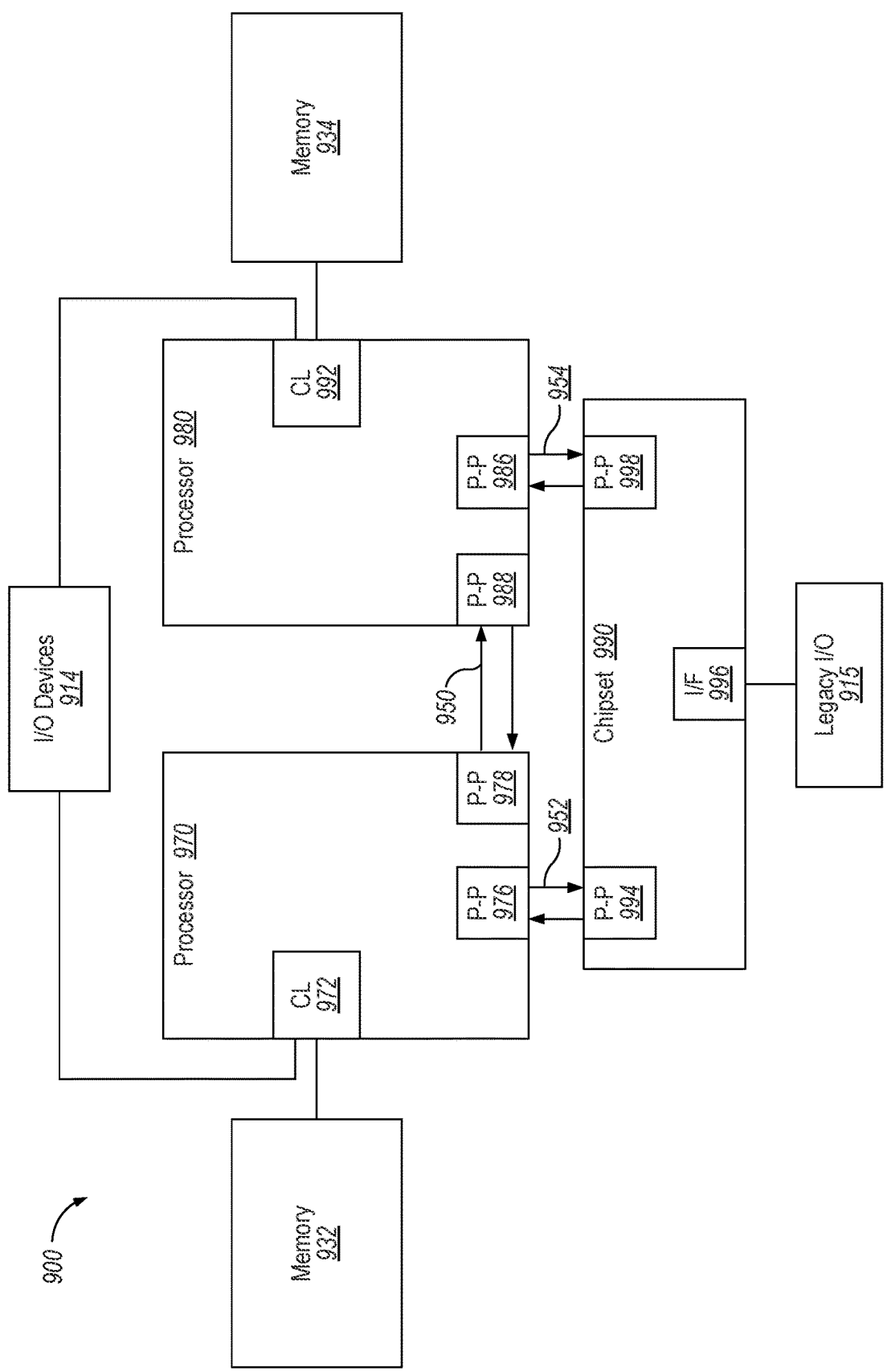
FIG. 9 is a block diagram of a computer system according to another implementation.

Referring now to FIG. 9, shown is a block diagram of a third system 900 that may implement hardware support for write-back invalidation by key identifier, in accordance with an implementation of the disclosure. Like elements in FIGS. 8 and 9 bear like reference numerals and certain aspects of FIG. 9 have been omitted from FIG. 8 in order to avoid obscuring other aspects of FIG. 9.

FIG. 9 illustrates that the processors 970, 980 may include integrated memory and I/O control logic ("CL") 972 and 992, respectively. For at least one implementation, the CL 972, 982 may include integrated memory controller units such as described herein. In addition. CL 972, 992 may also include I/O control logic. FIG. 9 illustrates that the memories 932, 934 are coupled to the CL 972, 992, and that I/O devices 914 are also coupled to the control logic 972, 992. Legacy I/O devices 915 are coupled to the chipset 990.

Figure 10:
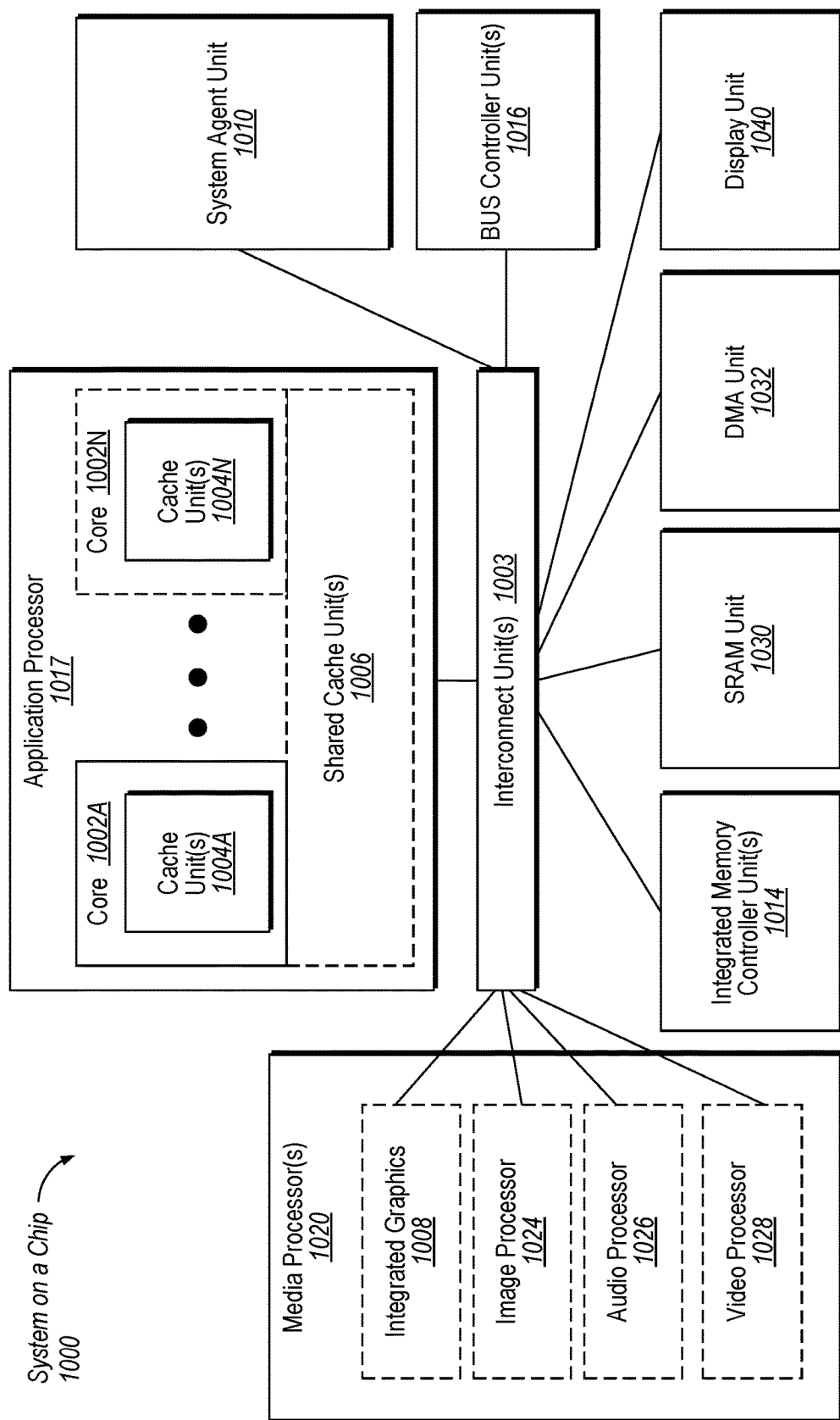
FIG. 10 is a block diagram of a system on a chip according to one implementation.

Within the exemplary SoC 1000 of FIG. 10, dashed lined boxes are features on more advanced SoCs. An interconnect unit(s) 1002 may be coupled to: an application processor 1017 which includes a set of one or more cores 1002A-N, cache units 1004A-N, and shared cache unit(s) 1006; a system agent unit 1010; a bus controller unit(s) 1016; an integrated memory controller unit(s) 1014; a set of one or more media processors 1020 which may include integrated graphics logic 1008, an image processor 1024 for providing still and/or video camera functionality, an audio processor 1026 for providing hardware audio acceleration, and a video processor 1028 for providing video encode/decode acceleration; a static random access memory (SRAM) unit 1030; a direct memory access (DMA) unit 1032; and a display unit 1040 for coupling to one or more external displays.

Within the exemplary SoC 1000 of FIG. 10, dashed lined boxes are features on more advanced SoCs. An interconnect unit(s) 1002 may be coupled to: an application processor 1017 which includes a set of one or more cores 1002A-N and shared cache unit(s) 1006; a system agent unit 1010; a bus controller unit(s) 1016; an integrated memory controller unit(s) 1014; a set of one or more media processors 1020 which may include integrated graphics logic 1008, an image processor 1024 for providing still and/or video camera functionality, an audio processor 1026 for providing hardware audio acceleration, and a video processor 1028 for providing video encode/decode acceleration; a static random access memory (SRAM) unit 1030; a direct memory access (DMA) unit 1032; and a display unit 1040 for coupling to one or more external displays.

Figure 11:
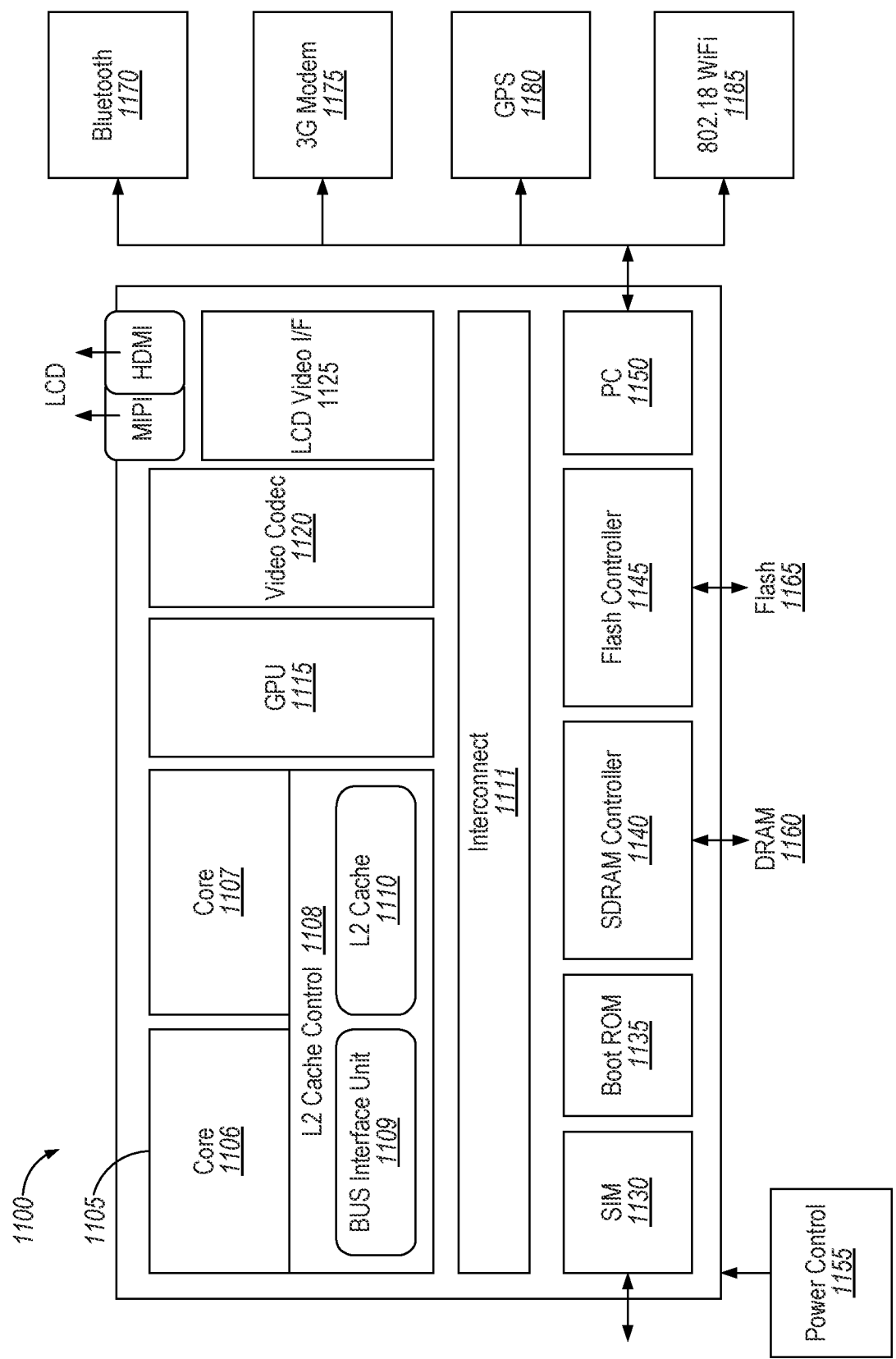
FIG. 11 illustrates another implementation of a block diagram for a computing system.

Turning next to FIG. 11, an implementation of a system on-chip (SoC) design that may implement hardware support for write-back invalidation by key identifier, in accordance with implementations of the disclosure is depicted. As an illustrative example, SoC 1100 is included in user equipment (UE). In one implementation, UE refers to any device to be used by an end-user to communicate, such as a hand-held phone, smartphone, tablet, ultra-thin notebook, notebook with broadband adapter, or any other similar communication device. A UE may connect to a base station or node, which can correspond in nature to a mobile station (MS) in a GSM network. The implementations of the page additions and content copying can be implemented in SoC 1100.

Here, SoC 1100 includes 2 cores—1106 and 1107. Similar to the discussion above, cores 1106 and 1107 may conform to an Instruction Set Architecture, such as a processor having the Intel® Architecture Core™, an Advanced Micro Devices, Inc. (AMD) processor, a MIPS-based processor, an ARM-based processor design, or a customer thereof, as well as their licensees or adopters. Cores 1106 and 1107 are coupled to cache control 1108 that is associated with bus interface unit 1109 and L2 cache 1110 to communicate with other parts of system 1100. Interconnect 1111 includes an on-chip interconnect, such as an IOSF, AMBA, or other interconnects discussed above, which can implement one or more aspects of the described disclosure.

In one implementation, SDRAM controller 1140 may connect to interconnect 1111 via cache 1110. Interconnect 1111 provides communication channels to the other components, such as a Subscriber Identity Module (SIM) 1130 to interface with a SIM card, a boot ROM 1135 to hold boot code for execution by cores 1106 and 1107 to initialize and boot SoC 1100, a SDRAM controller 1140 to interface with external memory (e.g. DRAM 1160), a flash controller 1145 to interface with non-volatile memory (e.g. Flash 1165), a peripheral control 1150 (e.g. Serial Peripheral Interface) to interface with peripherals, video codecs 1120 and Video interface 1125 to display and receive input (e.g. touch enabled input), GPU 1115 to perform graphics related computations, etc. Any of these interfaces may incorporate aspects of the implementations described herein.

In addition, the system illustrates peripherals for communication, such as a Bluetooth® module 1170, 3G modem 1175, GPS 1180, and Wi-Fi® 1185. Note as stated above, a UE includes a radio for communication. As a result, these peripheral communication modules may not all be included. However, in a UE some form of a radio for external communication should be included.

Figure 12:
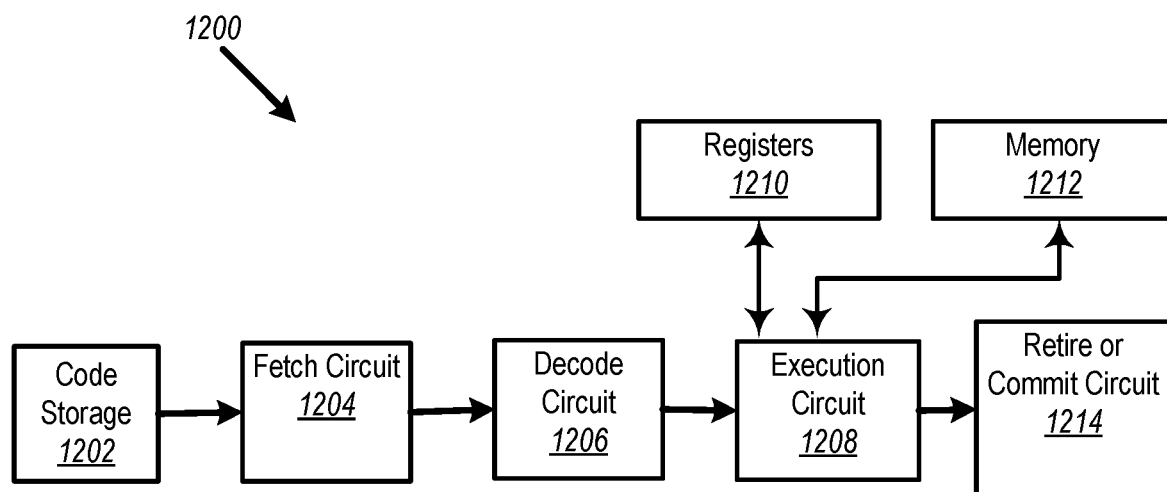
FIG. 12 is a block diagram of processing components for executing instructions that implements hardware support for a multi-key cryptographic engine, according one implementation.

FIG. 12 is a block diagram of processing components for executing instructions that implements write-back invalidation by key identifier. As shown, computing system 1200 includes code storage 1202, fetch circuit 1204, decode circuit 1206, execution circuit 1208, registers 1210, memory 1212, and retire or commit circuit 1214. In operation, an instruction (e.g., WBINVD-BY-KEYID) is to be fetched by fetch circuit 1204 from code storage 1202, which may comprise a cache memory, an on-chip memory, a memory on the same die as the processor, an instruction register, a general register, or system memory, without limitation. In one implementation, the instruction may have a format similar to that of instruction 1400 in FIG. 14. After fetching the instruction from code storage 1202, decode circuit 1206 may decode the fetched instruction, including by parsing the various fields of the instruction. After decoding the fetched instruction, execution circuit 1208 is to execute the decoded instruction. In performing the step of executing the instruction, execution circuit 1208 may read data from and write data to registers 1210 and memory 1212. Registers 1210 may include a data register, an instruction register, a vector register, a mask register, a general register, an on-chip memory, a memory on the same die as the processor, or a memory in the same package as the processor, without limitation. Memory 1212 may include an on-chip memory, a memory on the same die as the processor, a memory in the same package as the processor, a cache memory, or system memory, without limitation. After the execution circuit executes the instruction, retire or commit circuit 1214 may retire the instruction, ensuring that execution results are written to or have been written to their destinations, and freeing up or releasing resources for later use.

Figure 13:
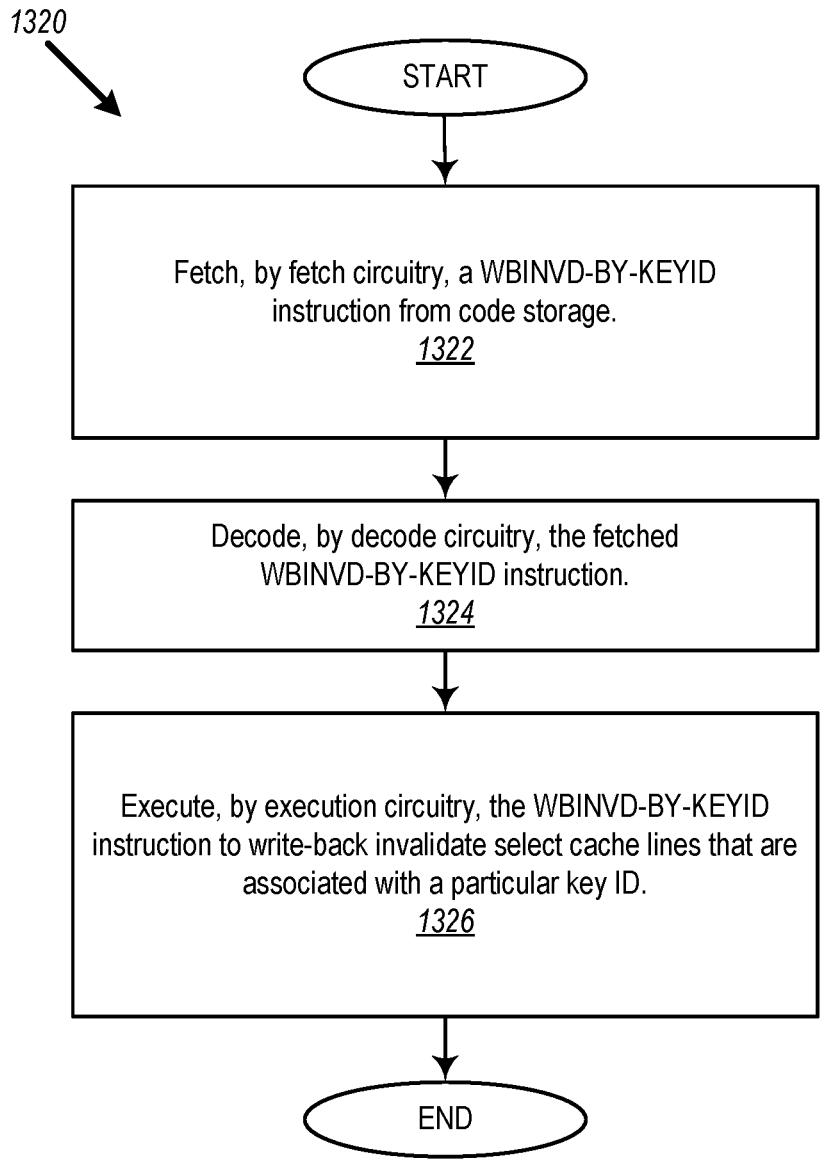
FIG. 13 is a flow diagram of an example method to be performed by a processor to execute an instruction to write-back invalidate by key identifier.

FIG. 13A is a flow diagram of an example method 1320 to be performed by a processor to execute a WBINVD-BY-KEYID instruction to cause a cache (e.g., an LLC or a snoop filter) to write back data to memory from select cache lines and invalidate those cache lines. After starting the process, a fetch circuit at block 1322 is to fetch the WBINVD-BY-KEYID instruction from code storage. At optional block 1324, a decode circuit may decode the fetched WBINVD-BY-KEYID instruction. At block 1326, an execution circuit is to execute the WBINVD-BY-KEYID instruction to generate one or more transactions to the LLC and/or snoop filter. These transaction may cause the LLC and/or snoop filter to write back data from select cache lines, and invalidate those cache lines, which are associated with a particular key ID, e.g., have the key ID within the upper-most address bits of an address tag in the cache.

Figure 14:
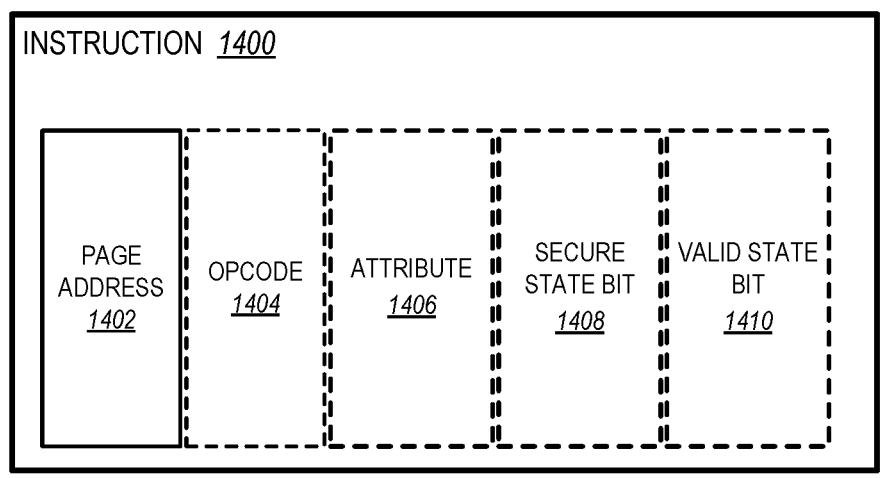
FIG. 14 is a block diagram illustrating an example format for instructions disclosed herein.

FIG. 14 is a block diagram illustrating an example format for instructions 1400 disclosed herein that implement hardware support for write-back invalidation by key identifier. The instruction 1400 may be WBINVD-BY-KEYID. The parameters in the format of the instruction 1400 may be different for WBINVD-BY-KEYID. As such, some of the parameters are depicted as optional with dashed lines. As shown, instruction 1400 may include a page address 1402, optional opcode 1404, optional attribute 1406, optional secure state bit 1408, and optional valid state bit 1410.

Figure 15:
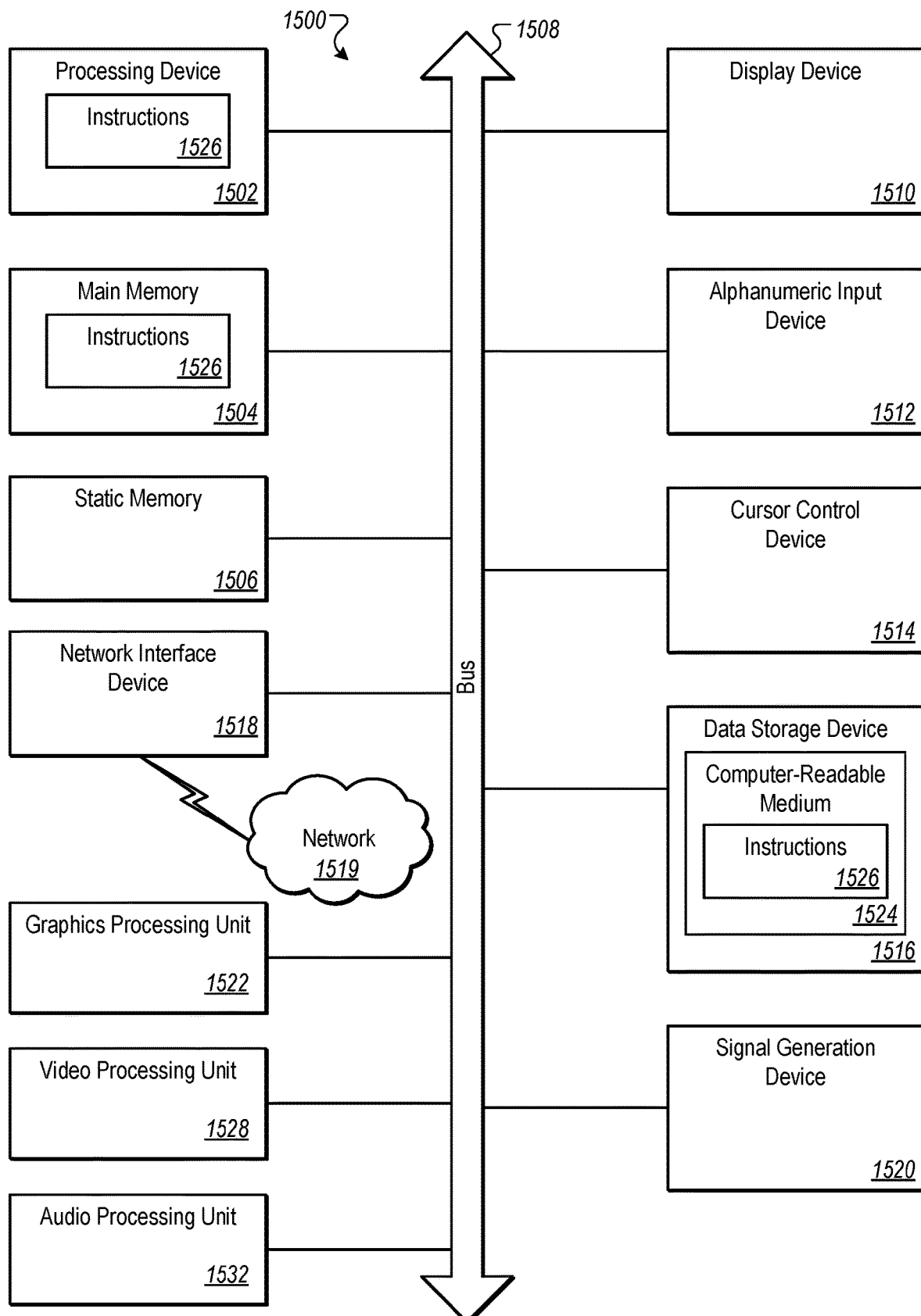
FIG. 15 illustrates another implementation of a block diagram for a computing system.

FIG. 15 illustrates a diagrammatic representation of a machine in the example form of a computing system 1500 within which a set of instructions, for causing the machine to implement hardware support for write-back invalidation by key identifier according any one or more of the methodologies discussed herein. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The implementations of the page additions and content copying can be implemented in computing system 1500.

The computing system 1500 includes a processing device 1502, main memory 1504 (e.g., flash memory, dynamic random access memory (DRAM) (such as synchronous DRAM (SDRAM) or DRAM (RDRAM), etc.), a static memory 1506 (e.g., flash memory, static random access memory (SRAM), etc.), and a data storage device 1516, which communicate with each other via a bus 1508.

Processing device 1502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1502 may also be one or more special-purpose processing devices such as an application-specific integrated circuit (ASIC), a field programmable gate array (FPGA), a digital signal processor (DSP), network processor, or the like. In one implementation, processing device 1502 may include one or more processor cores. The processing device 1502 is configured to execute the processing logic 1526 for performing the operations discussed herein.

In one implementation, processing device 1502 can be part of a processor or an integrated circuit that includes the disclosed LLC caching architecture. Alternatively, the computing system 1500 can include other components as described herein. It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

The computing system 1500 may further include a network interface device 1518 communicably coupled to a network 1519. The computing system 1500 also may include a video display device 1510 (e.g., a liquid crystal display (LCD) or a cathode ray tube (CRT)), an alphanumeric input device 1512 (e.g., a keyboard), a cursor control device 1514 (e.g., a mouse), a signal generation device 1520 (e.g., a speaker), or other peripheral devices. Furthermore, computing system 1500 may include a graphics processing unit 1522, a video processing unit 1528 and an audio processing unit 1532. In another implementation, the computing system 1500 may include a chipset (not illustrated), which refers to a group of integrated circuits, or chips, that are designed to work with the processing device 1502 and controls communications between the processing device 1502 and external devices. For example, the chipset may be a set of chips on a motherboard that links the processing device 1502 to very high-speed devices, such as main memory 1504 and graphic controllers, as well as linking the processing device 1502 to lower-speed peripheral buses of peripherals, such as USB, PCI or ISA buses.

The data storage device 1516 may include a computer-readable storage medium 1524 on which is stored software 1526 embodying any one or more of the methodologies of functions described herein. The software 1526 may also reside, completely or at least partially, within the main memory 1504 as instructions 1526 and/or within the processing device 1502 as processing logic during execution thereof by the computing system 1500; the main memory 1504 and the processing device 1502 also constituting computer-readable storage media.

The computer-readable storage medium 1524 may also be used to store instructions 1526 utilizing the processing device 1502, and/or a software library containing methods that call the above applications. While the computer-readable storage medium 1524 is shown in an example implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the disclosed implementations. The term "computer-readable storage medium" shall accordingly be taken to include, but not be limited to, solid-state memories, and optical and magnetic media.

The following examples pertain to further implementations.

Example 1 is an integrated circuit comprising: 1) a core coupled to a last level cache (LLC); 2) a memory controller coupled to the core, the memory controller to secure data of multiple domains, executed by the core, according to corresponding key identifiers, wherein a first key identifier for a first domain of the multiple domains is associated with physical addresses of memory that store data of the first domain; a) wherein, to flush and invalidate cache lines associated with the first key identifier, the core is to execute an instruction, which comprises the first key identifier, to generate a transaction comprising the first key identifier; and 3) a cache controller of the LLC, the cache controller coupled to the memory and, in response to the transaction, is to: a) identify matching entries in the LLC by comparison of the first key identifier with at least part of an address tag of a plurality of entries in a tag storage structure of the LLC, the matching entries associated with cache lines of the LLC; b) write back, to the memory, data stored in the cache lines; and c) mark the matching entries of the tag storage structure as invalid.

In Example 2, the integrated circuit of Example 1, wherein the LLC is an inclusive last level cache.

In Example 3, the integrated circuit of Example 1, wherein the cache controller is to partially match the first key identifier with key identifier portions of a plurality of address tags of the tag storage structure.

In Example 4, the integrated circuit of Example 1, wherein the LLC is a content-addressable memory (CAM), and wherein the tag storage structure comprises: 1) a key identifier cache (KIC) structure to store the key identifiers, which are searched for matches with the first key identifier; and 2) a metadata storage structure to store address tags, which correspond to the plurality of entries in the KIC structure, and associated coherency bits.

In Example 5, the integrated circuit of Example 1, wherein the LLC is a set-associative cache, and wherein the core is further to send the transaction to the LLC to cause the cache controller to, for a set of the set-associative cache: a) match the first key identifier to at least part of the address tag of a vector of ways of the set; and b) send the vector of ways of the set to the core.

In Example 6, the integrated circuit Example 5, wherein the transaction is a write-back-invalidate transaction comprising a set number of the set, a way number from among the vector of ways, and wherein, responsive to the write-back-invalidate transaction, the cache controller is to: a) compare the first key identifier to a key identifier portion of the address tag corresponding to the set number and the way number; and b) responsive to finding a match between the first key identifier and the key identifier portion, perform the write back and invalidate of the cache lines.

In Example 7, the integrated circuit of Example 1, wherein the LLC is a set-associative cache, the transaction is a write-back-invalidate transaction, which the core is to send to the cache controller, and wherein, responsive to the write-back-invalidate transaction, the cache controller is to match the first key identifier to the at least part of the address tag of the plurality of entries in corresponding one or more ways of a set of the tag storage structure, to identify the cache lines.

In Example 8, the integrated circuit of Example 1, further comprising a snoop filter that indexes locations of a plurality of cache lines for multiple levels of cache across multiple cores, and wherein the core is to execute the instruction to further direct the snoop filter to: a) identify second matching entries in the snoop filter by comparison of the first key identifier with at least part of a second address tag of a plurality of second entries in the snoop filter, the second matching entries associated with second cache lines of the plurality of cache lines; b) write back, to the memory, data stored in the second cache lines; and c) mark the second matching entries of the snoop filter as invalid.

Various implementations may have different combinations of the structural features described above. For instance, all optional features of the processors and methods described above may also be implemented with respect to a system described herein and specifics in the examples may be used anywhere in one or more implementations.

Example 9 is a system computing system comprising: 1) a memory; 2) a snoop filter coupled to the memory; and 3) a core coupled to a snoop filter, to a memory controller, and to the memory, the memory controller to secure data of multiple domains, executed by the core, according to corresponding key identifiers, wherein a first key identifier for a first domain of the multiple domains is associated with physical addresses of the memory that store data of the first domain; a) wherein, to flush and invalidate cache lines associated with the first key identifier, the core is to execute an instruction, which comprises the first key identifier, to generate a transaction comprising the first key identifier; and b) in response to the transaction, the snoop filter is to: i) identify matching entries in the snoop filter by comparison of the first key identifier with at least part of an address tag of a plurality of entries in the snoop filter, the matching entries associated with cache lines stored in cache of multiple cores; ii) write back, to the memory, data stored in the cache lines; and iii) mark the matching entries of the snoop filter as invalid In Example 10, the system of Example 9, wherein the snoop filter comprises set-associative cache, and wherein the core is further to send the transaction to the snoop filter to cause the snoop filter to, for a set of the set-associative cache: a) match the first key identifier to at least part of the address tag of a vector of ways of the set; and b) send the vector of ways of the set to the core.

In Example 10, the system of Example 9, wherein the snoop filter comprises set-associative cache, and wherein the core is further to send the transaction to the snoop filter to cause the snoop filter to, for a set of the set-associative cache: a) match the first key identifier to at least part of the address tag of a vector of ways of the set; and b) send the vector of ways of the set to the core.

In Example 11, the system of Example 10, wherein the transaction is a write-back-invalidate transaction comprising a set number of the set, a way number from among the vector of ways, and wherein, responsive to the write-back-invalidate transaction, the snoop filter is to: a) compare the first key identifier to a key identifier portion of the address tag corresponding to the set number and the way number; and b) responsive to finding a match between the first key identifier and the key identifier portion, perform the write back and invalidate of the cache lines.

In Example 12, the system of Example 9, wherein the snoop filter comprises set-associative cache, the transaction is a write-back-invalidate transaction, which the core is to send to the snoop filter, and wherein, responsive to the write-back-invalidate transaction, the snoop filter is to match the first key identifier to the at least part of the address tag of the plurality of entries in corresponding one or more ways of a set of the snoop filter, to identify the cache lines.

In Example 13, the system of Example 9, wherein the snoop filter is an inclusive snoop filter.

In Example 14, the system of Example 9, further comprising 1) a last level cache (LLC) coupled to the memory, the snoop filter, and to the core, wherein, to flush and invalidate cache lines associated with the first key identifier, the core is to execute the instruction to direct a cache controller, of the LLC, to: a) identify second matching entries in the LLC by comparison of the first key identifier with at least part of a second address tag of a plurality of entries in a tag storage structure of the LLC, the second matching entries associated with second cache lines of the LLC; b) write back, to the memory, data stored in the second cache lines; and c) mark the second matching entries of the snoop filter as invalid.

Various implementations may have different combinations of the structural features described above. For instance, all optional features of the processors and methods described above may also be implemented with respect to a system described herein and specifics in the examples may be used anywhere in one or more implementations.

Example 15 is a method comprising: 1) securing, by a memory controller, data of multiple domains according to corresponding key identifiers, wherein a first key identifier for a first domain of the multiple domains is associated with physical addresses of memory that store data of the first domain; 2) executing, by a processor core coupled to the memory controller, an instruction, which comprises the first key identifier, to generate a transaction comprising the first key identifier, wherein the instruction is to flush and invalidate cache lines associated with the first key identifier; and 3) responsive to execution of the instruction and by a last level cache (LLC) coupled to the processor core: a) identifying matching entries in the LLC by comparing the first key identifier with at least part of an address tag of a plurality of entries in a tag storage structure of the LLC, the matching entries associated with cache lines of the LLC; b) writing back, to the memory, data stored in the cache lines; and c) marking the matching entries of the tag storage structure as invalid In Example 16, the method of Example 15, wherein the tag storage structure is a content-addressable memory (CAM), and the identifying comprises performing a partial match of the first key identifier with key identifier portions of a plurality of address tags of the tag storage structure.

In Example 17, the method of Example 15, wherein the LLC is set-associative cache, the method further comprising 1) sending, by the core to the LLC, the transaction, causing the LLC to, for a set of the set-associative cache, perform operations comprising: a) matching the first key identifier to at least part of the address tag of a vector of ways of the set; and b) sending the vector of ways of the set to the core.

In Example 18, the method of Example 17, wherein the transaction is a write-back-invalidate transaction comprising a set number of the set, a way number from among the vector of ways, and wherein, responsive to the write-back-invalidate transaction, the LLC is to perform operations comprising: a) comparing the first key identifier to a key identifier portion of the address tag corresponding to the set number and the way number; and b) responsive to finding a match between the first key identifier and the key identifier portion: i) writing back, to the memory by the LLC, data stored in the cache lines; and ii) marking, by the LLC, the matching entries of the tag storage structure as invalid.

In Example 19, the method of Example 15, wherein the LLC is set-associative cache, the transaction is a write-back-invalidate transaction, and the method further comprises: a) sending, by the core, the write-back-invalidate transaction to the LLC; and b) responsive to the write-back-invalidate transaction, matching, by the LLC, the first key identifier to the at least part of the address tag of the plurality of entries in one or more ways of a set of the tag storage structure, to identify the cache lines.

In Example 20, the method of Example 15, further comprising: a) indexing, within a snoop filter, locations of a plurality of cache lines for multiple levels of cache across multiple cores; b) identifying second matching entries in the snoop filter by comparison of the first key identifier with at least part of a second address tag of a plurality of second entries in the snoop filter, the second matching entries associated with second cache lines of the plurality of cache lines; c) writing back, to the memory, data stored in the second cache lines; and d) marking the second matching entries of the snoop filter as invalid.

Various implementations may have different combinations of the structural features described above. For instance, all optional features of the processors and methods described above may also be implemented with respect to a system described herein and specifics in the examples may be used anywhere in one or more implementations.

Example 21 is a non-transitory computer readable medium storing instructions, which when executed by a processor, cause the processor to perform a plurality of operations comprising: 1) securing, by a memory controller, data of multiple domains according to corresponding key identifiers, wherein a first key identifier for a first domain of the multiple domains is associated with physical addresses of memory that store data of the first domain; 2) executing, by a processor core coupled to the memory controller, an instruction, which comprises the first key identifier, to generate a transaction comprising the first key identifier, wherein the instruction is to flush and invalidate cache lines associated with the first key identifier; and 3) responsive to execution of the instruction and by a last level cache (LLC) coupled to the processor core: a) identifying matching entries in the LLC by comparing the first key identifier with at least part of an address tag of a plurality of entries in a tag storage structure of the LLC, the matching entries associated with cache lines of the LLC; b) writing back, to the memory, data stored in the cache lines; and c) marking the matching entries of the tag storage structure as invalid In Example 22, the non-transitory computer readable medium of Example 21, wherein the tag storage structure is a content-addressable memory (CAM), and the identifying comprises performing a partial match of the first key identifier with key identifier portions of a plurality of address tags of the tag storage structure.

In Example 23, the non-transitory computer readable medium of Example 21, wherein the LLC is set-associative cache, the plurality of operations further comprises 1) sending, by the core to the LLC, the transaction, causing the LLC to, for a set of the set-associative cache, perform operations comprising: a) matching the first key identifier to at least part of the address tag of a vector of ways of the set; and b) sending the vector of ways of the set to the core.

In Example 24, the non-transitory computer readable medium of Example 23, wherein the transaction is a write-back-invalidate transaction comprising a set number of the set, a way number from among the vector of ways, and wherein, responsive to the write-back-invalidate transaction, the LLC is to perform operations comprising: a) comparing the first key identifier to a key identifier portion of the address tag corresponding to the set number and the way number; and b) responsive to finding a match between the first key identifier and the key identifier portion: i) writing back, to the memory by the LLC, data stored in the cache lines; and ii) marking, by the LLC, the matching entries of the tag storage structure as invalid.

In Example 25, the non-transitory computer readable medium of Example 21, wherein the LLC is set-associative cache, the transaction is a write-back-invalidate transaction, and the plurality of operations further comprise: a) sending, by the core, the write-back-invalidate transaction to the LLC; and b) responsive to the write-back-invalidate transaction, matching, by the LLC, the first key identifier to the at least part of the address tag of the plurality of entries in one or more ways of a set of the tag storage structure, to identify the cache lines.

In Example 26, the non-transitory computer readable medium of Example 21, wherein the plurality of operations further comprise: a) indexing, within a snoop filter, locations of a plurality of cache lines for multiple levels of cache across multiple cores; b) identifying second matching entries in the snoop filter by comparison of the first key identifier with at least part of a second address tag of a plurality of second entries in the snoop filter, the second matching entries associated with second cache lines of the plurality of cache lines; c) writing back, to the memory, data stored in the second cache lines; and d) marking the second matching entries of the snoop filter as invalid.

Various implementations may have different combinations of the structural features described above. For instance, all optional features of the processors and methods described above may also be implemented with respect to a system described herein and specifics in the examples may be used anywhere in one or more implementations.

Example 27 is a system comprising: 1) means for securing data of multiple domains according to corresponding key identifiers, wherein a first key identifier for a first domain of the multiple domains is associated with physical addresses of memory that store data of the first domain; 2) executing an instruction, which comprises the first key identifier, to generate a transaction comprising the first key identifier, wherein the instruction is to flush and invalidate cache lines of an LLC associated with the first key identifier; and 3) responsive to execution of the instruction means for: a) identifying matching entries in the LLC by comparing the first key identifier with at least part of an address tag of a plurality of entries in a tag storage structure of the LLC, the matching entries associated with cache lines of the LLC; b) writing back, to the memory, data stored in the cache lines; and c) marking the matching entries of the tag storage structure as invalid.

In Example 28, the system of Example 27, wherein the tag storage structure is a content-addressable memory (CAM), and means for identifying comprises means for performing a partial match of the first key identifier with key identifier portions of a plurality of address tags of the tag storage structure.

In Example 29, the system of Example 27, wherein the LLC is set-associative cache, the method further comprising 1) means for sending, to the LLC, the transaction, causing the LLC to, for a set of the set-associative cache, perform operations comprising: a) matching the first key identifier to at least part of the address tag of a vector of ways of the set; and b) sending the vector of ways of the set to the core.

In Example 30, the system of Example 29, wherein the transaction is a write-back-invalidate transaction comprising a set number of the set, a way number from among the vector of ways, and wherein, responsive to the write-back-invalidate transaction, the LLC is to perform operations comprising: a) comparing the first key identifier to a key identifier portion of the address tag corresponding to the set number and the way number; and b) responsive to finding a match between the first key identifier and the key identifier portion: i) writing back, to the memory by the LLC, data stored in the cache lines; and ii) marking, by the LLC, the matching entries of the tag storage structure as invalid.

In Example 31, the system of Example 27, wherein the LLC is set-associative cache, the transaction is a write-back-invalidate transaction, and the method further comprises: a) means for sending the write-back-invalidate transaction to the LLC; and b) responsive to the write-back-invalidate transaction, means for matching, by the LLC, the first key identifier to the at least part of the address tag of the plurality of entries in one or more ways of a set of the tag storage structure, to identify the cache lines.

In Example 32, the system of Example 27, further comprising: a) means for indexing, within a snoop filter, locations of a plurality of cache lines for multiple levels of cache across multiple cores; b) means for identifying second matching entries in the snoop filter by comparison of the first key identifier with at least part of a second address tag of a plurality of second entries in the snoop filter, the second matching entries associated with second cache lines of the plurality of cache lines; c) means for writing back, to the memory, data stored in the second cache lines; and d) means for marking the second matching entries of the snoop filter as invalid.

Various implementations may have different combinations of the structural features described above. For instance, all optional features of the processors and methods described above may also be implemented with respect to a system described herein and specifics in the examples may be used anywhere in one or more implementations.

Example 33 is an integrated circuit comprising: 1) a cache controller of a highest level cache of a processor; and 2) a core coupled to the cache controller, wherein the core is to execute one or more virtual machines, each virtual machine to be assigned a memory encryption key, wherein physical memory addresses mapped to virtual addresses of a first virtual machine include a first key identifier associated with a first encryption key of the first virtual machine; and a) wherein, in response to a request to retire the first virtual machine, the core is to direct the cache controller to write back and invalidate only cache lines of the processor whose metadata contain a match to the first encryption key.

In Example 34, the integrated circuit of Example 33, wherein the highest level cache comprises a last level cache (LLC).

In Example 35, the integrated circuit of Example 33, wherein to direct the cache controller to write back and invalidate the cache lines, the core is to: a) execute an instruction, which comprises the first key identifier, to generate a memory transaction comprising the first key identifier; and b) send the memory transaction to the cache controller.

While the disclosure has been described with respect to a limited number of implementations, those skilled in the art will appreciate numerous modifications and variations therefrom. It is intended that the appended claims cover all such modifications and variations as fall within the true spirit and scope of this disclosure.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the disclosure. It will be apparent, however, to one skilled in the art that these specific details need not be employed to practice the disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of a computer system have not been described in detail in order to avoid unnecessarily obscuring the disclosure.

The implementations are described with reference to determining validity of data in cache lines of a sector-based cache in specific integrated circuits, such as in computing platforms or microprocessors. The implementations may also be applicable to other types of integrated circuits and programmable logic devices. For example, the disclosed implementations are not limited to desktop computer systems or portable computers, such as the Intel® Ultrabooks™ computers. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. It is described that the system can be any kind of computer or embedded system. The disclosed implementations may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the implementations of methods, apparatuses, and systems described herein (whether in reference to hardware, firmware, software, or a combination thereof) are vital to a 'green technology' future balanced with performance considerations.

Although the implementations herein are described with reference to a processor, other implementations are applicable to other types of integrated circuits and logic devices. Similar techniques and teachings of implementations of the disclosure can be applied to other types of circuits or semiconductor devices that can benefit from higher pipeline throughput and improved performance. The teachings of implementations of the disclosure are applicable to any processor or machine that performs data manipulations. However, the disclosure is not limited to processors or machines that perform 512 bit, 256 bit, 128 bit, 64 bit, 32 bit, or 16 bit data operations and can be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of implementations of the disclosure rather than to provide an exhaustive list of all possible implementations of implementations of the disclosure.

Although the above examples describe instruction handling and distribution in the context of execution units and logic circuits, other implementations of the disclosure can be accomplished by way of a data or instructions stored on a machine-readable, tangible medium, which when performed by a machine cause the machine to perform functions consistent with at least one implementation of the disclosure. In one implementation, functions associated with implementations of the disclosure are embodied in machine-executable instructions. The instructions can be used to cause a general-purpose or special-purpose processor that is programmed with the instructions to perform the steps of the disclosure. Implementations of the disclosure may be provided as a computer program product or software which may include a machine or computer-readable medium having stored thereon instructions which may be used to program a computer (or other electronic devices) to perform one or more operations according to implementations of the disclosure. Alternatively, operations of implementations of the disclosure might be performed by specific hardware components that contain fixed-function logic for performing the operations, or by any combination of programmed computer components and fixed-function hardware components.

Instructions used to program logic to perform implementations of the disclosure can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of implementations of the disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one implementation, refers to the hardware, which is specifically configured to recognize and/or execute the code to be held on a non-transitory medium. Furthermore, in another implementation, use of a module refers to the non-transitory medium including the code, which is specifically adapted to be executed by the microcontroller to perform predetermined operations. And as can be inferred, in yet another implementation, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one implementation, use of the term logic includes hardware, such as transistors, registers, or other hardware, such as programmable logic devices.

Use of the phrase 'configured to,' in one implementation, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and/or 'operable to,' in one implementation, refers to some apparatus, logic, hardware, and/or element designed in such a way to enable use of the apparatus, logic, hardware, and/or element in a specified manner. Note as above that use of 'to,' capable 'to,' or 'operable to,' in one implementation, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one implementation, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one implementation, refer to a default and an updated value or state, respectively. For example, a default value potentially includes a high logical value, i.e. reset, while an updated value potentially includes a low logical value, i.e. set. Note that any combination of values may be utilized to represent any number of states.

The implementations of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform implementations of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one implementation" or "an implementation" means that a particular feature, structure, or characteristic described in connection with the implementation is included in at least one implementation of the disclosure. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

In the foregoing specification, a detailed description has been given with reference to specific exemplary implementations. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of implementation and other exemplarily language does not necessarily refer to the same implementation or the same example, but may refer to different and distinct implementations, as well as potentially the same implementation.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is, here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Also, the terms "first," "second," "third," "fourth," etc. as used herein are meant as labels to distinguish among different elements and may not necessarily have an ordinal meaning according to their numerical designation.

What is claimed is:

1. An integrated circuit comprising:
   a core coupled to a last level cache (LLC);
   a memory controller coupled to the core, the memory controller to secure data of multiple domains, executed by the core, according to corresponding key identifiers, wherein a first key identifier for a first domain of the multiple domains is associated with physical addresses of memory that store data of the first domain;

wherein, to flush and invalidate cache lines associated with the first key identifier, the core is to execute an instruction, which comprises the first key identifier, to generate a transaction comprising the first key identifier; and a cache controller for the LLC, the cache controller coupled to the memory and, in response to the transaction, is to:

identify matching entries in the LLC by a comparison of the first key identifier with at least part of an address tag of a plurality of entries in a tag storage structure, the matching entries associated with cache lines of the LLC;

write back, to the memory, data stored in the cache lines associated with the matching entries; and mark the matching entries of the tag storage structure as invalid;

wherein the tag storage structure comprises:

a key identifier cache (KIC) structure to store the key identifiers, which are searched for matches with the first key identifier, and a metadata storage structure to store address tags, which correspond to the plurality of entries in the KIC structure, and associated coherency bits.

2. The integrated circuit of claim 1, wherein the LLC is an inclusive last level cache.

3. The integrated circuit of claim 1, wherein the cache controller is to partially match the first key identifier with key identifier portions of a plurality of address tags of the tag storage structure.

4. The integrated circuit of claim 1, wherein the tag storage structure is a content addressable memory (CAM).

5. The integrated circuit of claim 1, wherein the LLC is a set-associative cache, and wherein the core is further to send the transaction to the LLC to cause the cache controller to, for a set of the set-associative cache:

match the first key identifier to at least part of the address tag of a vector of ways of the set; and send the vector of ways of the set to the core.

6. The integrated circuit claim 5, wherein the transaction is a write-back-invalidate transaction comprising a set number of the set, a way number from among the vector of ways, and wherein, responsive to the write-back-invalidate transaction, the cache controller is to:

compare the first key identifier to a key identifier portion of the address tag corresponding to the set number and the way number; and responsive to finding a match between the first key identifier and the key identifier portion, perform the write back and invalidate of the cache lines.

7. The integrated circuit of claim 1, wherein the LLC is a set-associative cache, the transaction is a write-back-invalidate transaction, which the core is to send to the cache controller, and wherein, responsive to the write-back-invalidate transaction, the cache controller is to match the first key identifier to the at least part of the address tag of the plurality of entries in corresponding one or more ways of a set of the tag storage structure, to identify the cache lines.

8. The integrated circuit of claim 1, further comprising a snoop filter that indexes locations of a plurality of cache lines for multiple levels of cache across multiple cores, and wherein the core is to execute the instruction to further direct the snoop filter to:

identify second matching entries in the snoop filter by comparison of the first key identifier with at least part of a second address tag of a plurality of second entries in the snoop filter, the second matching entries associated with second cache lines of the plurality of cache lines;

write back, to the memory, data stored in the second cache lines; and mark the second matching entries of the snoop filter as invalid.

9. A system comprising:

a memory;

a snoop filter coupled to the memory; and a core coupled to a snoop filter, to a memory controller, and to the memory, the memory controller to secure data of multiple domains, executed by the core, according to corresponding key identifiers, wherein a first key identifier for a first domain of the multiple domains is associated with physical addresses of the memory that store data of the first domain;

wherein, to flush and invalidate cache lines associated with the first key identifier, the core is to execute an instruction, which comprises the first key identifier, to generate a transaction comprising the first key identifier; and in response to the transaction, the snoop filter is to:

identify matching entries of the snoop filter by a comparison of the first key identifier with at least part of an address tag of a plurality of entries in the snoop filter, the matching entries associated with cache lines stored in cache of multiple cores;

write back, to the memory, data stored in the cache lines associated with the matching entries; and mark the matching entries of the snoop filter as invalid, wherein a key identifier cache (KIC) structure is to store the key identifiers, which are searched for matches with the first key identifier, and a metadata storage structure is to store address tags, which correspond to the plurality of entries in the KIC structure, and associated coherency bits.

10. The system of claim 9, wherein the snoop filter comprises set-associative cache, and wherein the core is further to send the transaction to the snoop filter to cause the snoop filter to, for a set of the set-associative cache:

match the first key identifier to at least part of the address tag of a vector of ways of the set; and send the vector of ways of the set to the core.

11. The system of claim 10, wherein the transaction is a write-back-invalidate transaction comprising a set number of the set, a way number from among the vector of ways, and wherein, responsive to the write-back-invalidate transaction, the snoop filter is to:

compare the first key identifier to a key identifier portion of the address tag corresponding to the set number and the way number; and responsive to finding a match between the first key identifier and the key identifier portion, perform the write back and invalidate of the cache lines.

12. The system of claim 9, wherein the snoop filter comprises set-associative cache, the transaction is a write-back-invalidate transaction, which the core is to send to the snoop filter, and wherein, responsive to the write-back-invalidate transaction, the snoop filter is to match the first key identifier to the at least part of the address tag of the plurality of entries in corresponding one or more ways of a set of the snoop filter, to identify the cache lines.

13. The system of claim 9, wherein the snoop filter is an inclusive snoop filter.

14. The system of claim 9, further comprising a last level cache (LLC) coupled to the memory, the snoop filter, and to the core, wherein, to flush and invalidate cache lines associated with the first key identifier, the core is to execute the instruction to direct a cache controller, of the LLC, to:
- identify second matching entries in the LLC by comparison of the first key identifier with at least part of a second address tag of a plurality of entries in a tag storage structure of the LLC, the second matching entries associated with second cache lines of the LLC;
- write back, to the memory, data stored in the second cache lines; and
- mark the second matching entries of the snoop filter as invalid.

15. A method comprising:
- securing, by a memory controller, data of multiple domains according to corresponding key identifiers, wherein a first key identifier for a first domain of the multiple domains is associated with physical addresses of memory that store data of the first domain;
- executing, by a processor core coupled to the memory controller, an instruction, which comprises the first key identifier, to generate a transaction comprising the first key identifier, wherein the instruction is to flush and invalidate cache lines associated with the first key identifier; and
- responsive to execution of the instruction and by a last level cache (LLC) coupled to the processor core:
  - identifying matching entries in the LLC by comparing the first key identifier with at least part of an address tag of a plurality of entries in a tag storage structure, the matching entries associated with cache lines of the LLC;
  - writing back, to the memory, data stored in the cache lines associated with the matching entries; and
  - marking the matching entries of the tag storage structure as invalid, wherein the tag storage structure a key identifier cache (KIC) structure to store the key identifiers, which are searched for matches with the first key identifier, and
  - a metadata storage structure to store address tags, which correspond to the plurality of entries in the KIC structure, and associated coherency bits.

16. The method of claim 15, wherein the tag storage structure is a content-addressable memory (CAM), and the identifying comprises performing a partial match of the first key identifier with key identifier portions of a plurality of address tags of the tag storage structure.

17. The method of claim 15, wherein the LLC is set-associative cache, the method further comprising sending, by the core to the LLC, the transaction, causing the LLC to, for a set of the set-associative cache, perform operations comprising:
- matching the first key identifier to at least part of the address tag of a vector of ways of the set; and
- sending the vector of ways of the set to the core.

18. The method of claim 17, wherein the transaction is a write-back-invalidate transaction comprising a set number of the set, a way number from among the vector of ways, and wherein, responsive to the write-back-invalidate transaction, the LLC cache controller is to perform operations comprising:
- comparing the first key identifier to a key identifier portion of the address tag corresponding to the set number and the way number; and
- responsive to finding a match between the first key identifier and the key identifier portion:
  - writing back, to the memory by the LLC, data stored in the cache lines; and
  - marking, by the LLC, the matching entries of the tag storage structure as invalid.

19. The method of claim 15, wherein the LLC is set-associative cache, the transaction is a write-back-invalidate transaction, and the method further comprises:
- sending, by the core, the write-back-invalidate transaction to the LLC; and
- responsive to the write-back-invalidate transaction, matching, by the LLC, the first key identifier to the at least part of the address tag of the plurality of entries in one or more ways of a set of the tag storage structure, to identify the cache lines.

20. The method of claim 15, further comprising:
- indexing, within a snoop filter, locations of a plurality of cache lines for multiple levels of cache across multiple cores;
- identifying second matching entries in the snoop filter by comparison of the first key identifier with at least part of a second address tag of a plurality of second entries in the snoop filter, the second matching entries associated with second cache lines of the plurality of cache lines;
- writing back, to the memory, data stored in the second cache lines; and
- marking the second matching entries of the snoop filter as invalid.

* * * * *